(12) United States Patent
Hamamoto et al.

(10) Patent No.: US 12,405,168 B2
(45) Date of Patent: Sep. 2, 2025

(54) PHASE DIFFERENCE MEASURING DEVICE, BEAM OUTPUT APPARATUS AND PHASE DIFFERENCE MEASURING METHOD

(71) Applicants: MITSUBISHI HEAVY INDUSTRIES, LTD., Tokyo (JP); Institute for Laser Technology, Osaka (JP)

(72) Inventors: Koichi Hamamoto, Tokyo (JP); Tomoya Morioka, Tokyo (JP); Shingo Nishikata, Tokyo (JP); Hiroyuki Daigo, Tokyo (JP); Noriaki Miyanaga, Osaka (JP)

(73) Assignees: MITSUBISHI HEAVY INDUSTRIES, LTD., Tokyo (JP); INSTITUTE FOR LASER TECHNOLOGY, Osaka (JP)

( * ) Notice: Subject to any disclaimer, the term of this patent is extended or adjusted under 35 U.S.C. 154(b) by 289 days.

(21) Appl. No.: 17/915,009

(22) PCT Filed: Feb. 16, 2021

(86) PCT No.: PCT/JP2021/005586
§ 371 (c)(1),
(2) Date: Sep. 27, 2022

(87) PCT Pub. No.: WO2021/199737
PCT Pub. Date: Oct. 7, 2021

(65) Prior Publication Data
US 2023/0152163 A1    May 18, 2023

(30) Foreign Application Priority Data
Mar. 31, 2020    (JP) .................. 2020-061991

(51) Int. Cl.
*G01J 9/02*    (2006.01)
*G02B 5/30*    (2006.01)
*G02B 5/32*    (2006.01)

(52) U.S. Cl.
CPC .............. *G01J 9/02* (2013.01); *G02B 5/3083* (2013.01); *G02B 5/32* (2013.01); *G01J 2009/0261* (2013.01)

(58) Field of Classification Search
CPC ...... G01J 2009/0261; G01J 9/02; G02B 5/32; G02B 5/3083
See application file for complete search history.

(56) References Cited

U.S. PATENT DOCUMENTS

| | | | |
|---|---|---|---|
| 9,325,149 | B2 | 4/2016 | Hamamoto et al. |
| 2009/0134310 | A1 | 5/2009 | Goodno |

(Continued)

FOREIGN PATENT DOCUMENTS

| | | |
|---|---|---|
| DE | 102006015518 | 12/2007 |
| JP | 2010-533895 | 10/2010 |

(Continued)

OTHER PUBLICATIONS

Translation of the International Preliminary Report on Patentability issued Oct. 13, 2022 in International Application No. PCT/JP2021/005586.

(Continued)

*Primary Examiner* — Maurice C Smith
(74) *Attorney, Agent, or Firm* — Wenderoth, Lind & Ponack, L.L.P.

(57) ABSTRACT

A phase difference measuring device is provided with a phase conversion device and a detection device. The phase conversion device converts a first laser beam that passes therethrough so that the first laser beam includes a phase distribution of one cycle in an azimuth direction in a cross section of the first laser beam included in an arbitrary virtual plane perpendicular to an optical axis of the first laser beam. The detection device detects an azimuth angle of an intensity centroid of an interference pattern generated by at least a (Continued)

part of a first laser beam that has passed through the phase conversion device, and a part of a second laser beam that derives from a laser beam as seed light from which the first laser beam derives, of which an optical intensity is same as the at least a part of the first laser beam, and detects an inter-beam phase difference of the second laser beam.

16 Claims, 16 Drawing Sheets

(56) References Cited

U.S. PATENT DOCUMENTS

| | | |
|---|---|---|
| 2010/0134869 A1 | 6/2010 | Bernet et al. |
| 2015/0138618 A1 | 5/2015 | Hamamoto et al. |
| 2016/0291343 A1* | 10/2016 | Prasad .................. G02B 21/36 |

FOREIGN PATENT DOCUMENTS

| | | |
|---|---|---|
| JP | 2011-254028 | 12/2011 |
| JP | 2014-216418 | 11/2014 |
| JP | 6071202 | 2/2017 |
| WO | 2013/108850 | 7/2013 |
| WO | WO-2015132752 A2 * | 9/2015 ............. G02B 26/06 |

OTHER PUBLICATIONS

International Search Report issued May 11, 2021 in International Application No. PCT/JP2021/005586.

Sueda et al., "Laguerre-Gaussian beam generated with a multilevel spiral phase plate for high intensity laser pulses", Optics Express, Optical Society of America, Jul. 26, 2004, pp. 3548-3553.

Extended European Search Report issued Jul. 13, 2023 in corresponding EP Patent Application No. 21781262.7, with English translation.

* cited by examiner

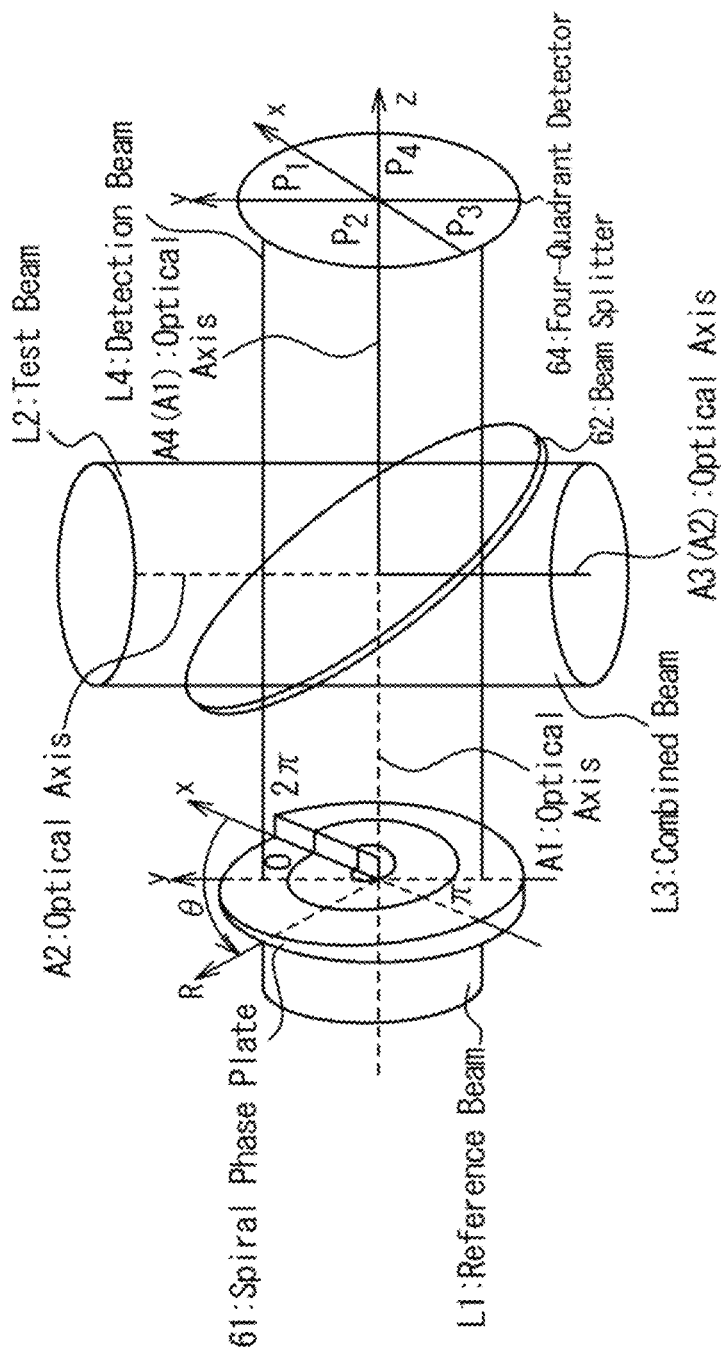

F I G. 9 D
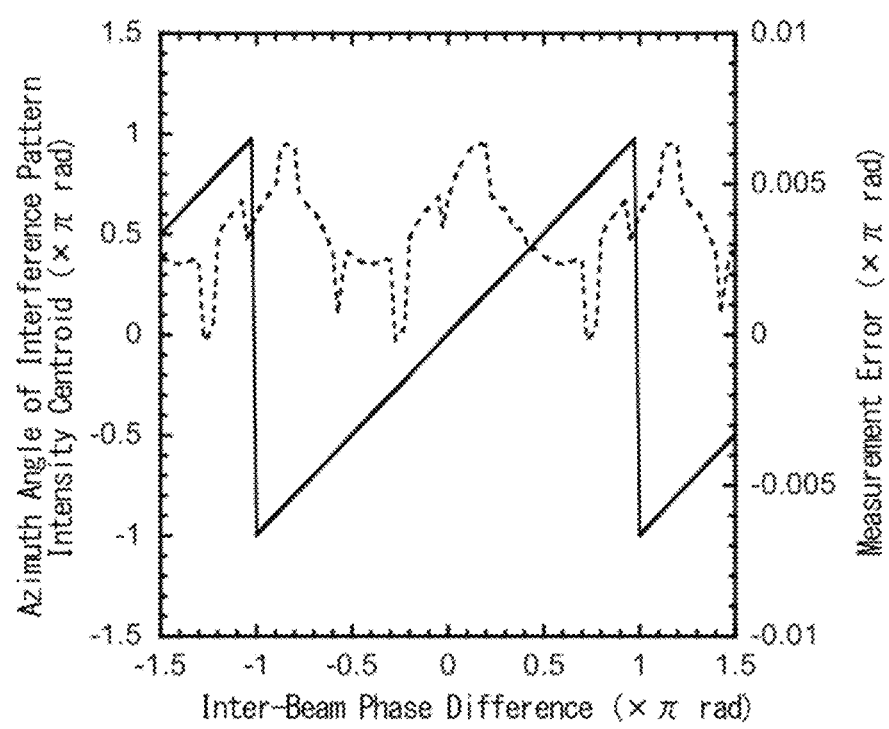

PHASE DIFFERENCE MEASURING DEVICE, BEAM OUTPUT APPARATUS AND PHASE DIFFERENCE MEASURING METHOD

TECHNICAL FIELD

The present invention relates to a phase difference measuring device, a beam output apparatus and a phase difference measuring method, and can be suitably used as a phase difference measuring device, a beam output apparatus and a phase difference measuring method for a laser beam, for example.

BACKGROUND

High-quality and high-power laser light is required in fields such as laser processing, scientific research, nuclear fusion, space debris removal, and security. However, due to factors such as heat generation, optical damage, and non-linear optical effects, there is a limit to an output that can be achieved as a single laser beam. Therefore, the technology for combining a plurality of laser beams is being studied to increase the output power.

Herein, when combining a plurality of laser beams, it is preferable to match a phase of each laser beam. Therefore, a device, a process, or the like for temporal modulation and/or demodulation (frequency shift, phase modulation, or the like) of each laser beam is required.

In connection with the above, Patent Literature 1 (US 2009/0134310 A1) discloses a laser system that combines a plurality of laser beams. In this laser system, a frequency shift is applied to each laser beam in order to calculate a phase of each laser beam.

Patent Literature 2 (Japanese Patent Publication No. 2014-216418) discloses a phase-locked laser device that combines a plurality of laser beams. In this phase-locked laser device, a frequency shift and a phase modulation are applied to each laser beam in order to calculate a phase of each laser beam.

In addition, in order to respond to a change in beam intensity, it is necessary to observe an interference pattern by use of a plurality of sensors and calculate. When a pointing of a laser beam changes, an appearance of interference fringes changes (for example: the interference fringes are tilted, a spacing between the interference fringes changes, or the like). In order to respond to such changes, it is necessary to observe the interference pattern by use of a plurality of sensors.

In connection to the above, Patent Literature 3 (Japanese Patent No. 6071202) discloses a multi-beam coupling device that couples a plurality of beams. In this multi-beam coupling device, a spatial interference pattern is used in order to control a phase of each laser beam. Since a phase is controlled based on a one-dimensional interference pattern, phase measurement is necessary at two or more positions for each beam.

In addition, Non-Patent Literature 1 (K. Sueda, G. Miyaji, N. Miyanaga and M. Nakatsuka, "Laguerre-Gaussian beam generated with a multilevel spiral phase plate for high intensity laser pulses", OPTICS EXPRESS, Optical Society of America. Jul. 26, 2004, pp. 3548-3553.) discloses a phase distribution of a 16-step spiral phase plate, a prototype example, an interference pattern generated by a beam with 16-step spiral phase plate and a reference beam.

CITED LIST

Patent Literature

[Patent Literature 1] US 2009/0134310 A1

[Patent Literature 2] Japanese Patent Publication No. 2014-216418

[Patent Literature 3] Japanese Patent No. 6071202

Non-Patent Literature

[Non-Patent Literature 1] K. Sueda, G. Miyaji, N. Miyanaga and M. Nakatsuka, "Laguerre-Gaussian beam generated with a multilevel spiral phase plate for high intensity laser pulses", OPTICS EXPRESS, Optical Society of America, Jul. 26, 2004, pp. 3548-3553.

SUMMARY

Phase difference between laser beams will be detected or measured in order to generate a high-power and high-quality laser beam. Other objectives and new features will be clarified by disclosures of the present description and attached drawings.

A phase difference measuring device according to an embodiment is provided with a phase conversion device and a detection device. The phase conversion device converts a first laser beam that passes therethrough so that the first laser beam includes a phase distribution of one cycle in an azimuth direction in a cross section of the first laser beam that has passed therethrough included in an arbitrary virtual plane perpendicular to an optical axis of the first laser beam. The detection device detects an azimuth angle of an intensity centroid of an interference pattern and detects an inter-beam phase difference of a second laser beam with respect to the first laser beam based on the azimuth angle. The interference pattern is generated by a shaped detection beam obtained by cutting out a part of a cross section of a detection beam into a shape of a circle with a point, where the cross section of the detection beam and an optical axis of the phase conversion device intersect, as a center thereof. The cross section of the detection beam is perpendicular to an optical axis of the detection beam. The detection beam is obtained by combining a first partial intensity laser beam and a second partial intensity laser beam on a same optical path. The first partial intensity laser beam has at least a part of an intensity component of the first laser beam that has passed through the phase conversion device. The second partial intensity laser beam has at least a part of an intensity component of a second laser beam derived from a laser beam as seed light from which the first laser beam derives.

A beam output apparatus according to an embodiment is provided with a first beam splitter, a phase conversion device, a detection device, and a phase controller. The first beam splitter splits a laser beam that is to be seed light into a first laser beam and a second laser beam. The phase conversion device converts the first laser beam that passes therethrough, so that the first laser beam includes a phase distribution of one cycle in an azimuth direction in a cross section of the first laser beam that has passed therethrough included in an arbitrary virtual plane perpendicular to an optical axis of the first laser beam. The detection device detects an azimuth angle of an intensity centroid of an interference pattern and detects an inter-beam phase difference of the second laser beam with respect to the first laser beam based on the azimuth angle. The interference pattern is generated by a shaped detection beam obtained by cutting out a part of a cross section of the detection beam into a shape of a circle with a point, where the cross section of the detection beam and an optical axis of the phase conversion device intersect, as a center thereof. The cross section of the detection beam is perpendicular to an optical axis of a detection beam. The detection beam is obtained by combining a first partial intensity laser beam and a second partial intensity laser beam on a same optical path. The first partial intensity laser beam has at least a part of an intensity component of the first laser beam that has passed through the phase conversion device. The second partial intensity laser beam has at least a part of an intensity component of the second laser beam. The phase controller controls a phase of the second laser beam based on the phase difference.

A phase difference measuring method according to an embodiment includes: converting a first laser beam that passes through a phase conversion device, so that the first laser beam includes a phase distribution of one cycle in an azimuth direction in a cross section of the first laser beam that has passed therethrough included in an arbitrary virtual plane perpendicular to an optical axis of the first laser beam; detecting an azimuth angle of an intensity centroid of an interference pattern; and detecting an inter-beam phase difference of a second laser beam with respect to the first laser beam based on the azimuth angle. The interference pattern is generated by a shaped detection beam obtained by cutting out a part of a cross section of the detection beam into a shape of a circle with a point, where the cross section of the detection beam and an optical axis of the phase conversion device intersect, as a center thereof. The cross section of the detection beam is perpendicular to an optical axis of a detection beam. The detection beam is obtained by combining a first partial intensity laser beam and a second partial intensity laser beam on a same optical path. The first partial intensity laser beam has at least a part of an intensity component of the first laser beam that is converted. The second partial intensity laser beam has at least a part of an intensity component of the second laser beam derived from a laser beam as seed light from which the first laser beam derives.

According to an embodiment, a high-power and high-quality laser beam can be generated.

BRIEF DESCRIPTION OF THE DRAWINGS

FIG. 2A is a diagram for describing an operation principle of a phase difference measuring device according to an embodiment.

FIG. 9D is a graph that shows an example of a relationship of a measured value of an azimuth angle of an interference pattern intensity centroid obtained by a phase difference measuring device that uses the multilevel spiral phase plate shown in FIG. 9A and a phase difference measurement error, both with respect to an actual phase difference between a reference beam that has passed through the multilevel spiral phase plate and a test beam.

DETAILED DESCRIPTION

An embodiment for implementing a phase difference measuring device, a beam output apparatus and a phase difference measuring method according to the present invention will be described below with reference to attached drawings. Hereinafter, a laser light beam may be referred to as a laser beam or a beam.

First Embodiment

Figure 1:
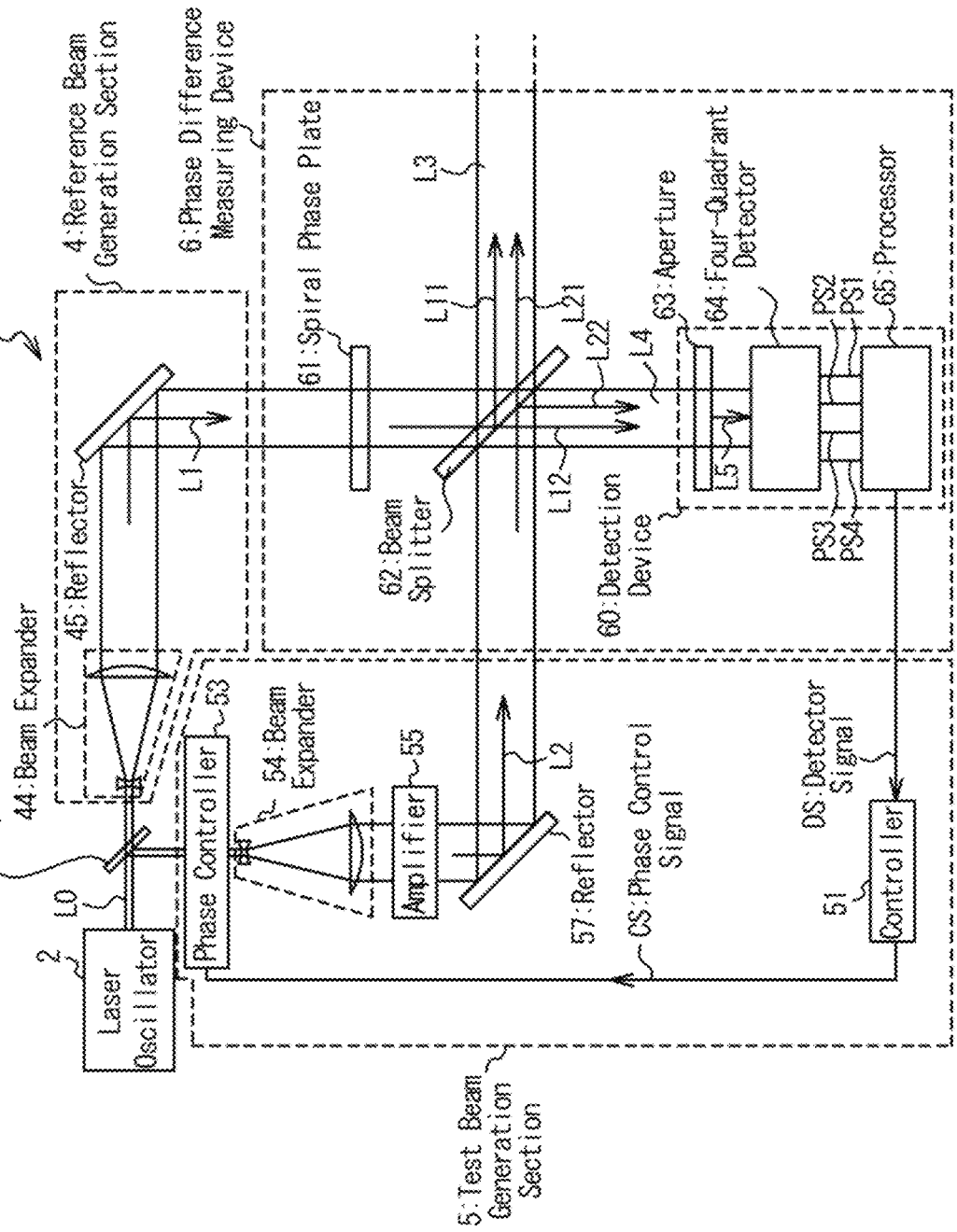
FIG. 1 is a diagram that shows a configuration example of a beam output apparatus according to an embodiment.

Components of the beam output apparatus 1 according to an embodiment will be described with reference to FIG. 1. FIG. 1 is a diagram that shows a configuration example of a beam output apparatus 1 according to an embodiment.

The beam output apparatus 1 in FIG. 1 is provided with a laser oscillator 2, a beam splitter 3, a reference beam generation section 4, a test beam generation section 5 and a phase difference measuring device 6.

Components of the reference beam generation section 4 in FIG. 1 will be described. The reference beam generation section 4 is provided with a beam expander 44 and a reflector 45.

Components of the test beam generation section 5 in FIG. 1 will be described. The test beam generation section 5 is provided with a controller 51, a phase controller 53, a beam expander 54, an amplifier 55, and a reflector 57.

Components of the phase difference measuring device 6 in FIG. 1 will be described. The phase difference measuring device 6 is provided with a spiral phase plate 61, a beam splitter 62, and a detection device 60. The detection device 60 is provided with an aperture 63, a four-quadrant detector 64, and a processor 65.

Connection relationship between components of the beam output apparatus 1 in FIG. 1 will be described. The laser oscillator 2 generates a laser beam L0 that is to be seed light. The beam splitter 3 is arranged downstream of the laser oscillator 2 and splits the generated laser beam L0 into a first laser beam and a second laser beam. The first laser beam and the second laser beam may be outputted to different directions.

The reference beam generation section 4 is arranged downstream of the beam splitter 3 and incidents the first laser beam to output a reference beam L1. In other words, the reference beam generation section 4 is arranged at a position where the first laser beam is incident.

In the reference beam generation section 4, the beam expander 44 may be arranged upstream to the reflector 45. In other words, the beam expander 44 enlarges a cross-sectional area of the first laser beam and outputs it. In addition, the reflector 45 reflects the first laser beam of which the cross-sectional area is enlarged to output as the reference beam L1. It should be noted that the order of enlarging the cross-sectional area and reflecting may be changed. In other words, the beam expander 44 may be arranged upstream to the reflector 45 and may be arranged downstream of the reflector 45.

The test beam generation section 5 is arranged downstream of the beam splitter 3 and incidents the second laser beam to output a test beam L2. In other words, the test beam generation section 5 is arranged at a position where the second laser beam outputted from the beam splitter 3 is incident.

In the test beam generation section 5, the phase controller 53 incidents the second laser beam and shifts a phase thereof. At that time, the phase controller 53 performs a phase shift of the second laser beam based on a phase control signal CS that is electrically provided from the controller 51. The beam expander 54 receives the second laser beam of which the phase is shifted, enlarges a cross-sectional area thereof, and outputs it. In other words, the beam expander 54 is arranged downstream of the phase controller 53. The amplifier 55 receives the second laser beam of which the cross-sectional area is enlarged, amplifies an optical intensity thereof, and outputs it. In other words, the amplifier 55 is arranged downstream of the beam expander 54. The reflector 57 reflects the second laser beam of which the optical intensity is amplified and outputs it as the test beam L2. In other words, the reflector 57 is arranged downstream of the amplifier 55. The controller 51 is electrically provided with a detector signal DS from the processor 65 of the phase difference measuring device 6 that will be described later, and outputs the phase control signal CS based on the detector signal DS. In other words, although the controller 51 is electrically connected upstream to the phase controller 53, the controller 51 may not be optically connected between other components of the test beam generation section 5. It should be noted that an optical arrangement of the components of the test beam generation section 5 may be arbitrarily changed within a technically consistent range.

The beam splitter 62 has a low reflection coating on one side and an anti-reflection coating on the other side, and guides a test beam L22, that is a slight part of an intensity component (power) of the test beam L2 being reflected thereby, and a reference beam L12, that is a most part of an intensity component (power) of the reference beam L1 being transmitted therethrough, to the detection device 60, in parallel to each other. The phase difference measuring device 6 receives the reference beam L1 and the test beam L2 and outputs the detector signal DS that shows a result of measuring an inter-beam phase difference between those two beams L1 and L2. In other words, the phase difference measuring device 6 is arranged downstream of the reference beam generation section 4 and is arranged downstream of the test beam generation section 5 as well. It should be noted that, from the reference beam L1 and the test beam L2 that are inputted, the phase difference measuring device 6 outputs a most part of the test beam L2 and a slight part of the reference beam L1, that were not used for the phase difference measurement, as a combined beam L3. It should be noted that the combined beam L3 may be outputted to be combined to another beam, and this combining may be performed by another optical system that is not illustrated.

In the phase difference measuring device 6, the spiral phase plate 61 receives and passes the reference beam L1 and converts a phase distribution of the passing reference beam L1. The beam splitter 62 transmits, on one hand, a most part of the reference beam L1 of which the phase distribution is converted as the reference beam L12, and reflects a slight part as a residual reflected beam L11. In addition, the beam splitter 62 reflects, on the other hand, a slight part of the test beam L2 as the test beam L22 and outputs a most part of the test beam L2 as a transmitted beam L21. In addition, the test beam L22 and the reference beam L12 are outputted to the detection device 60 as a detection beam L4. In other words, the beam splitter 62 is arranged at a position where the reference beam L1 and the test beam L2 intersect. It should be noted that a transmittance and a reflectance of the beam splitter 62 are not limited to the above example.

In the detection device 60, the aperture 63 receives the detection beam L4 and passes a part thereof. The four-quadrant detector 64 is provided with quadrant sensors that detect an optical intensity of the part of the detection beam L4 that has passed through the aperture 63 and generates optical intensity signals PS1 to PS4 that electrically represent an optical intensity distribution thereof. In other words, the four-quadrant detector 64 is a sensor device arranged downstream of the aperture 63. The processor 65 is electrically supplied with the optical intensity signals PS1 to PS4, calculates the phase difference based on them, and generates the detector signal DS that electrically represents the calculated phase difference. In other words, the processor 65 is electrically connected to downstream of the four-quadrant detector 64. The processor 65 may be provided with a computer provided with a microcomputer chip that performs predetermined processes or a Central Processing Unit (CPU) that executes predetermined programs, a storage device that stores the programs and various data, and various interfaces that perform inputs and outputs of data from or to outside. It should be noted that an analog microcomputer is more advantageous for increasing control speed.

An operation of the beam output apparatus 1 in FIG. 1, that is, the phase difference measuring method according to the present embodiment, will be described. At first, the laser oscillator 2 generates the laser beam L0 that is to be the seed light. This laser beam L0 may be a continuous wave or a pulsed wave.

Next, the beam splitter 3 splits the laser beam L0 into a first laser beam and a second laser beam. Herein, the beam splitter 3 may be a half mirror that transmits a part of the laser beam L0 as the first laser beam and reflects another part of the laser beam L0 as the second laser beam. In addition, ratios of transmission and reflection do not need to be the same.

Next, the reference beam generation section 4 receives the first laser beam and generates the reference beam L1. At first, the beam expander 44 enlarges the cross-sectional area of the first laser beam and outputs it as a parallel beam. The beam expander 44 may be provided with a combination of a plurality of lenses, for example. Next, the reflector 45 reflects the first laser beam, of which the cross-sectional area is enlarged, to output as the reference beam L1. It should be noted that the order of the enlarging the cross-sectional area and the reflecting may be changed.

In parallel to the generation of the reference beam L1, the test beam generation section 5 receives the second laser beam and generates the test beam L2. At first, the controller 51 generates the phase control signal CS based on the detector signal DS. Next, the phase controller 53 controls the phase of the second laser beam based on the phase control signal CS. For example, the phase controller 53 adjusts the phase of the second laser beam that passes through the phase controller 53 based on the phase control signal CS. Next, the beam expander 54 enlarges the cross-sectional area of the second laser beam of which the phase is shifted and outputs it as a parallel beam. Next, the amplifier 55 amplifies the second laser beam of which the cross-sectional area is enlarged. Next, the reflector 57 reflects the amplified second laser beam and outputs it as the test beam L2 to the beam splitter 62. It should be noted that the order of shifting the phase, enlarging the cross-sectional area, amplifying, and reflecting of the second laser beam may be changed within a technically consistent range.

Next, the phase difference measuring device 6 measures an inter-beam phase difference of the test beam L2 with respect to the reference beam L1. FIG. 2A is a diagram for describing an operation principle of the phase difference measuring device 6 according to an embodiment. At first, the spiral phase plate 61 converts the phase distribution of the reference beam L1 that passes therethrough. The spiral phase plate 61 converts an incident beam of which the phase is spatially uniform to a transmitted beam having a spatial phase distribution. For example, the spiral phase plate 61 shown in FIG. 2A has a configuration in that a material is transparent and a thickness gradually increases in an azimuth direction with the optical axis A1 thereof as a center of rotation. By this spiral phase plate 61, the converted phase distribution of the reference beam L1 is configured to totally include a range of phase of one cycle, for example a range of phase from zero radian to $2\pi$ radians, along the azimuth direction in an arbitrary cross-section perpendicular to the optical axis A1 of the reference beam L1. Preferably, the spiral phase plate 61 may be configured so that, when going around in a predetermined direction along the azimuth angle in an arbitrary cross-section perpendicular to the optical axis A2 of the reference beam L1, a distribution density of an arbitrary phase included in a monotonically increasing phase range of one cycle is uniform. For example, the spiral phase plate 61 may be configured so that the phase becomes equal to the azimuth angle in a desired cross-section of the reference beam L1 perpendicular to the optical axis A2.

Figure 2B:
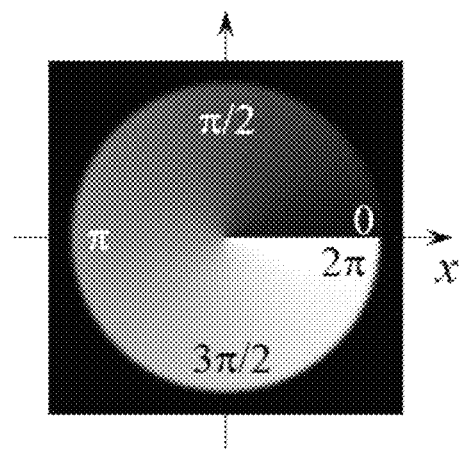
FIG. 2B is a diagram that shows an example of a phase distribution in a cross-section perpendicular to an optical axis direction of a reference beam that has passed through a spiral phase plate according to an embodiment.

FIG. 2B is a diagram that shows an example of a phase distribution in a cross-section perpendicular to the axis A1 of the reference beam L1 that has passed through a spiral phase plate 61 according to an embodiment. In the example of FIG. 2B, a phase difference between a phase at an arbitrary point included in an arbitrary cross-section perpendicular to the optical axis A1 shown in FIG. 2A of the reference beam L1 that has passed through the spiral phase plate 61 according to the present embodiment and a reference phase at an arbitrary reference point included in an x-axis matches an azimuth angle from the x-axis to the arbitrary point with the optical axis A1 of the reference beam L1 as a center of rotation. In FIG. 2B, a more advanced phase is represented in a darker color, a more lagging phase is represented in a lighter color, the darkest color represents zero radian phase, and the lightest color represents $2\pi$ radians phase. A phase distributed in such a way will be referred to as a spiral phase distribution for convenience.

The beam splitter 62 combines the reference beam L1 that has passed through the spiral phase plate 61 and the test beam L2, and generates the combined beam L3 and the detection beam L4 for detecting the phase difference. In the combined beam L3, optical axes of the transmitted beam L21 and the residual reflected beam L11 are parallel to each other, and therefore, it is necessary to adjust an intersection angle between the test beam L2 and the reference beam L1 and the arrangement angle of the beam splitter 62 so that the optical axes of the test beam L22 and the reference beam L12 are parallel to each other in the detection beam L4 for detecting the phase difference. Herein, the beam splitter 62 may transmit a most part (for example: more than 99%) of the reference beam L1 as the reference beam L12 and reflect a slight part (for example: less than 1%) thereof as the residual reflected beam L11.

The beam splitter 62 may transmit a most part (for example: more than 99%) of the test beam L2 as the transmitted beam L21 and reflect a slight part (for example: less than 1%) as the test beam L22.

It should be noted that, from a point of view of combining the combined beam L3 with another combined beam to generate a strong laser beam, it is not necessary, originally, to include the residual reflected beam L11 in the combined beam L3. However, since a ratio of the residual reflected beam L11 included in the combined beam L3 is very small (for example: 1/10,000), there is no concern that a quality of the combined beam L3 is substantially deteriorated.

Figure 3:
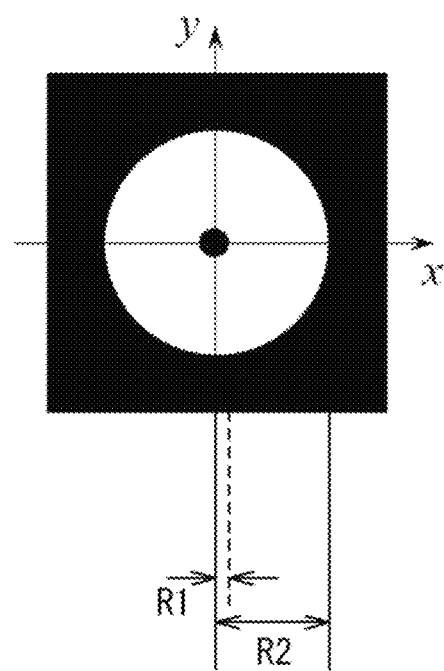
FIG. 3 is a diagram that shows a configuration example of an aperture according to an embodiment.

A group of the reference beam L12 and the test beam L22 will be referred to as detection beam L4. The detection device 60 detects an azimuth angle of an intensity centroid in an interference pattern that the reference beam L12 and the test beam L22, that are included in the detection beam L4, generate. At first, the aperture 63 masks a part of the detection beam L4 that passes therethrough. FIG. 3 is a diagram that shows a configuration example of the aperture 63 according to an embodiment. In the example of FIG. 3, a part, that is included inside a circle having a radius R1 with the optical axis A4 shown in FIG. 2A as a center, of the detection beam L4, and a part, that is included outside a circle having a radius R2 with the optical axis A4 as a center, of the detection beam L4, are masked by the aperture 63.

It should be noted that, a phase of a part of the detection beam L4 that is included in a region closed to the optical axis A4 may be uncertain. In addition, an optical intensity of a part of the detection beam L4 that is included in a region far from the optical axis A4 may be non-uniform. Therefore, by masking those regions by the aperture 63, it is expected that an accuracy of detection of the azimuth angle of the intensity centroid, that will be described below, improves. A part of the detection beam L4 that was not masked by the aperture 63 will be referred to as a shaped detection beam L5 for convenience.

Figure 4A:
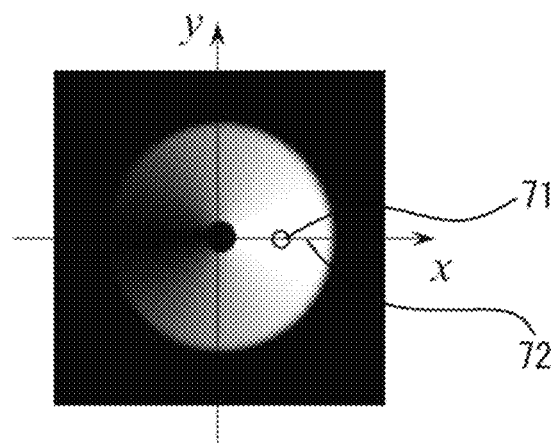
FIG. 4A is a diagram for describing a calculation of a phase difference from an interference pattern obtained by a phase difference measuring device according to an embodiment.

The four-quadrant detector 64 receives the shaped detection beam L5 and detects an optical intensity thereof. Herein, an interference pattern generated by the reference beam L12 and the test beam L22 is drawn in the shaped detection beam L5 received by the four-quadrant detector 64. FIG. 4A is a diagram that shows an example of a reference interference pattern generated by a reference beam L12 and a test beam L22 according to an embodiment. In FIG. 4A, in the interference pattern, a part of which an optical intensity is higher is represented by a lighter color, and a part of which an optical intensity is lower is represented by a darker color. An outer circumference of the interference pattern in FIG. 4A is a circle and this circle corresponds to a circle that has a radius R2 of the aperture 63. In addition, a center of the interference pattern in FIG. 4A corresponds to an optical axis of the shaped detection beam L5. The optical intensity of the interference pattern in FIG. 4A is more strongly distributed in a right direction when viewed from the center with respect to the paper surface. The centroid of the optical intensity distribution in the interference pattern will be referred to as an optical intensity centroid of the interference pattern or an interference pattern intensity centroid 71, for convenience. In addition, in a cartesian coordinate system x-y, an azimuth angle θ of the interference pattern intensity centroid 71 is defined to take a positive value counterclockwise from the x-axis. In the example of FIG. 4A, it is shown that the angle θ is zero radian, and this shows that the inter-beam phase difference between the reference beam L12 and the test beam L22, that is, the inter-beam phase difference between the reference beam L1 and the test beam L2 on the beam splitter 62, is zero.

The four-quadrant detector 64 has a quadrant optical intensity sensor. The quadrant optical intensity sensor detects respective optical intensities of the shaped detection beam L5 that is split into four parts. That is, an arbitrary cartesian coordinate system x-y is defined on a virtual plane perpendicular to the optical axis of the shaped detection beam L5 with an origin that matches this optical axis, and then four quadrants according to this cartesian coordinate system x-y is considered. A first quadrant is a region of which the azimuth angle in FIG. 2B is from zero radian to π/2 radians, a second quadrant is a region from π/2 radians to n radians, a third quadrant is a region from n radians to 3π/2 radians, and a fourth quadrant is a region from 3π/2 radians to 2π radians.

The quadrant optical intensity sensor that the four-quadrant detector 64 has respectively detects optical intensities of the four parts of the shaped detection beam L5 that respectively correspond to those four quadrants. The optical intensity detected in the first quadrant will be referred to as $P_1$, the optical intensity detected in the second quadrant will be referred to as $P_2$, the optical intensity detected in the third quadrant will be referred to as $P_3$, and the optical intensity detected in the fourth quadrant will be referred to as $P_4$. The four-quadrant detector 64 generates optical intensity signals PS1 to PS4 that electrically represent the detected four optical intensities $P_1$ to $P_4$, respectively, and outputs them to the processor 65.

The processor 65 is supplied by the four-quadrant detector 64 with the optical intensity signals PS1, PS2, PS3 and PS4 that electrically represent optical intensities, and generates the detector signal DS. As an example, the processor 65 can calculate the angle θ that represents the azimuth angle 72, from a coordinate X on the x-axis and a coordinate Y on the y-axis of the interference pattern intensity centroid 71, based on the following formula.

$$X=(P_1-P_2-P_3+P_4)/(P_1+P_2+P_3+P_4)$$

$$Y=(P_1+P_2-P_3-P_4)/(P_1+P_2+P_3+P_4)$$

$$\cos\theta=X/(X^2+Y^2)^{1/2}$$

$$\sin\theta=Y/(X^2+Y^2)^{1/2}$$

Figure 4B:
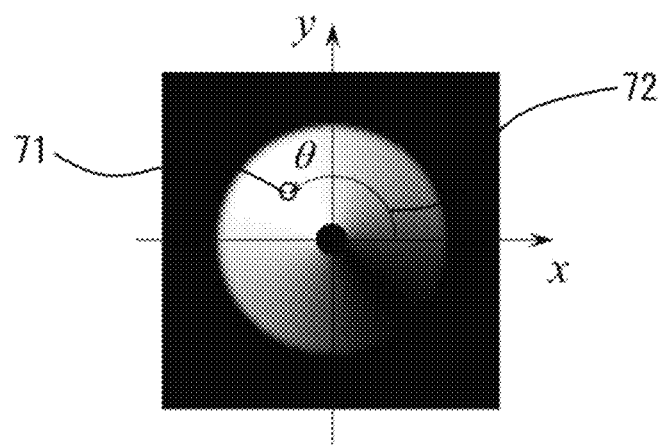
FIG. 4B is a diagram for describing a calculation of a phase difference from an interference pattern obtained by a phase difference measuring device according to an embodiment.
Figure 4C:
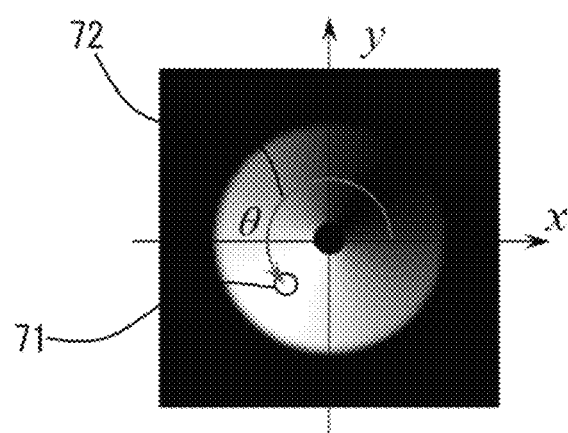
FIG. 4C is a diagram for describing a calculation of a phase difference from an interference pattern obtained by a phase difference measuring device according to an embodiment.

An example of a relationship between an optical intensity distribution of an interference pattern and an azimuth angle 72 of an interference pattern intensity centroid 71 will be shown with reference to FIG. 4B and FIG. 4C. FIG. 4B and FIG. 4C are diagrams that show examples of relationships between an optical intensity distribution of an interference pattern obtained by the phase difference measuring device 6 according to an embodiment and an azimuth angle 72 of an interference pattern intensity centroid 71. In the example of FIG. 4B, the interference pattern intensity centroid 71 exists on a bisector of an intersection angle of the x-axis and y-axis in the second quadrant, and an angle θ that represents the azimuth angle 72 thereof is 3π/4 radians. In the example of FIG. 4C, the interference pattern intensity centroid 71 exists on a bisector of an intersection angle of the x-axis and y-axis in the third quadrant, and an angle θ that represents the azimuth angle 72 thereof is 5π/4 radians.

The processor 65 generates, after calculating the angle θ that represent the azimuth angle 72, the detector signal DS that represents the angle θ, and outputs it to the controller 51 of the test beam generation section 5.

Next, the test beam generation section 5 performs, based on the detector signal DS, a feedback control of the phase of the test beam L2. At first, the controller 51 receives the detector signal DS that is outputted from the processor 65 of the phase difference measuring device 6. The controller 51 generates, based on the angle θ that the detector signal DS represents, the phase control signal CS for controlling the phase controller 53, and outputs it to the phase controller 53. Next, the phase controller 53 receives the phase control signal CS, and controls, based on a value that the phase control signal CS represents, the test beam L2 so that the phase difference with respect to the reference beam L1 becomes zero with a desired accuracy.

Figure 5:
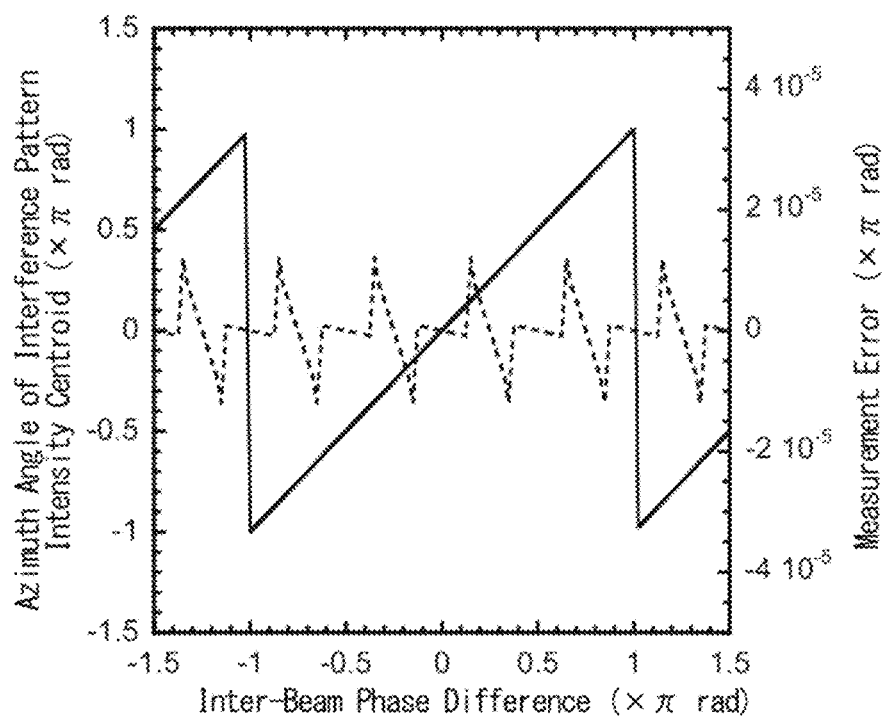
FIG. 5 is a graph that shows an example of a relationship of a measured value of an azimuth angle of an interference pattern intensity centroid obtained by a phase difference measuring device according to an embodiment and a phase difference measurement error, both with respect to an actual inter-beam phase difference.

It will be described that the measurement of the inter-beam phase difference between the reference beam L1 and the test beam L2, by the phase difference measuring device 6 according the present embodiment, has an excellent accuracy, with reference to FIG. 5 to FIG. 7. FIG. 5 is a graph that shows an example of a relationship of a measured value of an azimuth angle 72 of an interference pattern intensity centroid 71 obtained by a phase difference measuring device 6 according to an embodiment and a phase difference measurement error, both with respect to an actual inter-beam phase difference. In the graph of FIG. 5, the horizontal axis represents the actual phase difference of the test beam L2 with respect to the reference beam L1, that is, the inter-beam phase difference, the left-side vertical axis represents the measured value of the azimuth angle 72 of the interference pattern intensity centroid 71 obtained by the phase difference measuring device 6 according to the present embodiment, and the right-side vertical axis represents a difference value between them, that is, a measurement error of the phase difference. Of the two graphs included in the graph of FIG. 5, the solid line graph corresponds to the left-side vertical axis, and the dotted line graph corresponds to the right-side vertical axis. As it can be read from FIG. 5, the measurement error of the inter-beam phase difference according to the present embodiment is included within a range of an order of $\pm 1.5\times 10^5 \times \pi$ radians. As described above, in the example of FIG. 5, the measurement of the inter-beam phase difference between the reference beam L1 and the test beam L2 by the phase difference measuring device 6 according to the present embodiment has an excellent accuracy.

Figure 6:
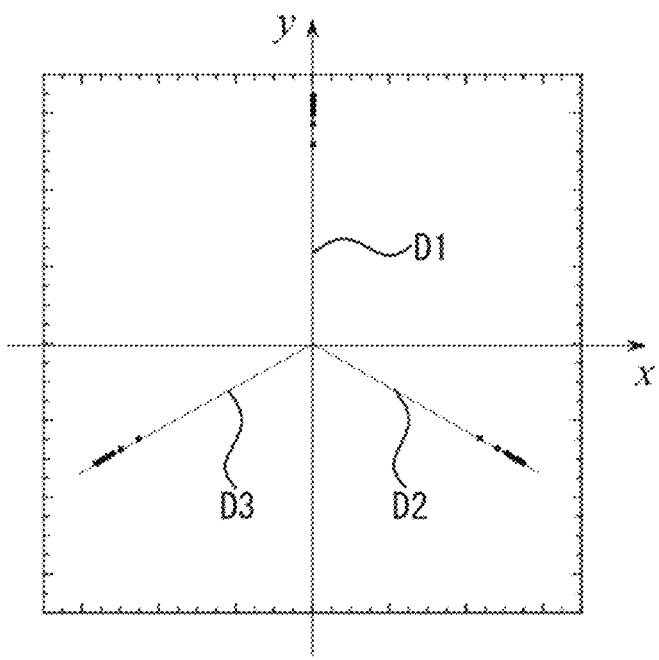
FIG. 6 is a diagram that shows an example of a measurement result of an angle that represents an azimuth angle of an interference pattern intensity centroid obtained by a phase difference measuring device according to an embodiment.

FIG. 6 is a diagram that shows an example of a measurement result of an angle θ that represents an azimuth angle 72 of an interference pattern intensity centroid 71 obtained by a phase difference measuring device 6 according to an embodiment. The horizontal axis and the vertical axis of FIG. 6 correspond to each axis of the cartesian coordinate system x-y in a plane perpendicular to an optical axis of the detection beam L4, respectively. In the example of FIG. 6, in each of cases where an inter-beam phase difference Δϕ between the reference beam L1 and the test beam L2 is π/2 radians, −π/6 radians and −5π/6 radians, measurements of the angle θ that represent the azimuth angle 72 has been performed by changing an optical intensity ratio of the test beam L22 with respect to the reference beam L12 from 0.44 to 4. Consequently, it has been obtained a result in that, in each of phase differences Δϕ, a position of the interference pattern intensity centroid 71 just moves on a straight line D1 (in case of π/2 radians), a straight line D2 (in case of −π/6 radians) or a straight line D3 (in case of −5π/6 radians) that correspond to each phase differences Δϕ, and that the angles θ does not change. As described above, a measurement of a phase difference between a reference beam L1 and a test beam L2 by the phase difference measurement device 6 according to the present embodiment is not affected by a difference of ratio of optical intensities of the reference beam L1 and the test beam L2.

Figure 7:
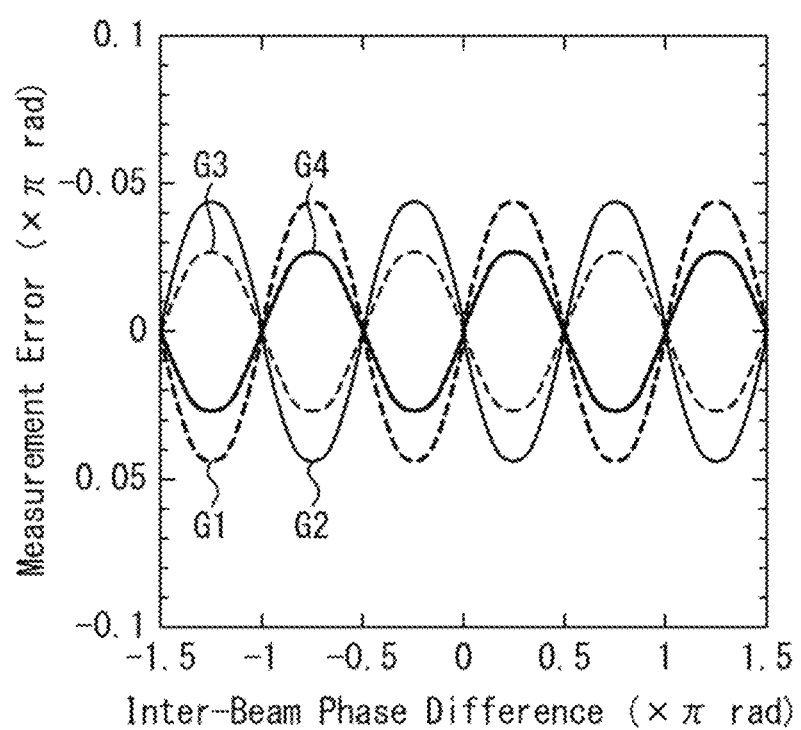
FIG. 7 is a graph that shows an example of measurement error of a phase difference obtained by a phase difference measurement device according to an embodiment.

FIG. 7 is a graph that shows an example of measurement error of a phase difference obtained by a phase difference measurement device 6 according to an embodiment. In FIG. 7, the horizontal axis represents the inter-beam phase difference between the reference beam L1 and the test beam L2, and the vertical axis represents a measurement error of the phase. FIG. 7 includes a first graph G1, a second graph G2, a third graph G3, and a fourth graph G4. The first graph G1 represents a measurement error of the angle θ that corresponds to the inter-beam phase difference in a case where an optical axis direction (pointing) of the test beam L22 is shifted of DLD/4 in a vertical direction (y-axis direction) with respect to the reference beam L12, that is, in a case where a parallelism of the test beam L22 with respect to the reference beam L12 is shifted of DLD/4 in the vertical direction. Herein, DLD is a Diffraction Limited Divergence (angle) and is herein defined as the below formula with respect to a flat top intensity circular beam.

$$DLD=2.44\times \lambda/D$$

Herein, λ represents a wavelength of the shaped detection beam L5 (in fact, a wavelength of each beam that derives from the laser oscillator 2), and D represents a beam diameter of the shaped detection beam L5. In addition, the second graph G2 represents a measurement error of the angle θ that corresponds to the inter-beam phase difference in a case where the parallelism of the test beam L22 with respect to the reference beam L12 is shifted of DLD/4 in a horizontal direction (x-axis direction). Similarly, the third graph G3 represents a measurement error of the angle θ that corresponds to the inter-beam phase difference in a case where the parallelism of the test beam L22 with respect to the reference beam L12 is shifted of DLD/5 in a horizontal direction. In addition, the fourth graph G4 represents a measurement error of the angle θ that corresponds to the inter-beam phase difference in a case where the parallelism of the test beam L22 with respect to the reference beam L12 is shifted of DLD/5 in a vertical direction.

When focusing on the first graph G1 and the second graph G2 in FIG. 7, an absolute value of the measurement error is less than 0.05π radians. In addition, when focusing on the third graph G3 and the fourth graph G4 in FIG. 7, an absolute value of the measurement error is less than 0.03π radians. As described above, a measurement of the inter-beam phase difference between the reference beam L1 and the test beam L2 by the phase difference measuring device 6 according to the present embodiment can suppress an effect due to a shift of the optical axes between the reference beam L12 and the test beam L22, that is, a shift of inter-section angle between the reference beam L1 and the test beam L2, in other words a parallelism between the reference beam component L11 and the test beam component L21 in the combined beam L3, to be relatively small.

It should be noted that, when the shift in optical axis direction of the test beam L22 with respect to the reference beam L12 exceeds DLD/4, the parallelism between the reference beam component L1I and the test beam component L21 in the combined beam L3 is shifted, and a measurement and correction of a beam pointing are separately necessary for any method of beam combining. Therefore, herein, it is not necessary to consider a case where the shift in the optical axis of the test beam L22 with respect to the reference beam L12 exceeds DLD/4.

It should be noted that the configuration of the beam output apparatus 1 in FIG. 1 is merely an example, and a part of the above-described components may be omitted or replaced to another component, another component may be added, or a positional relationship between components may be changed, as long as the above-described operation can be performed.

Figure 8:
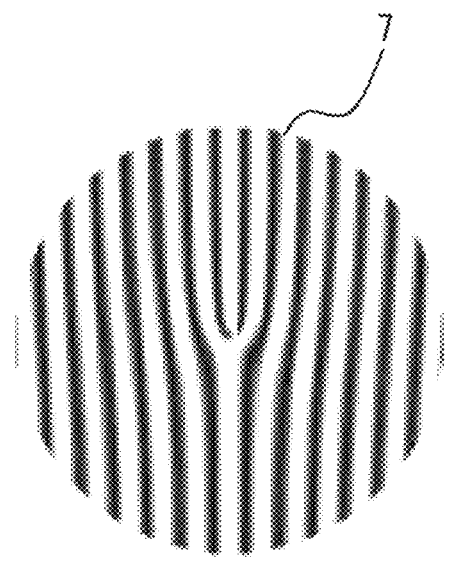
FIG. 8 is a diagram that shows an example of a hologram that can generate a spiral phase distribution.

As a variation example of the beam output apparatus 1 shown in FIG. 1, a hologram corresponding to the spiral phase plate 61 may be used instead of the spiral plate 61. This hologram may be a phase modulation type hologram or an amplitude modulation type hologram. Since such a technology is disclosed in a non-patent literature 1 (K. Sueda, G. Miyaji, N. Miyanaga and M. Nakatsuka, "Laguerre-Gaussian beam generated with a multilevel spiral phase plate for high intensity laser pulses", OPTICS EXPRESS. Optical Society of America, Jul. 26, 2004, pp. 3548-3553), further detailed description will be omitted. FIG. 8 is a diagram that shows an example of a hologram 7 that can generate a spiral phase distribution.

Figure 9A:
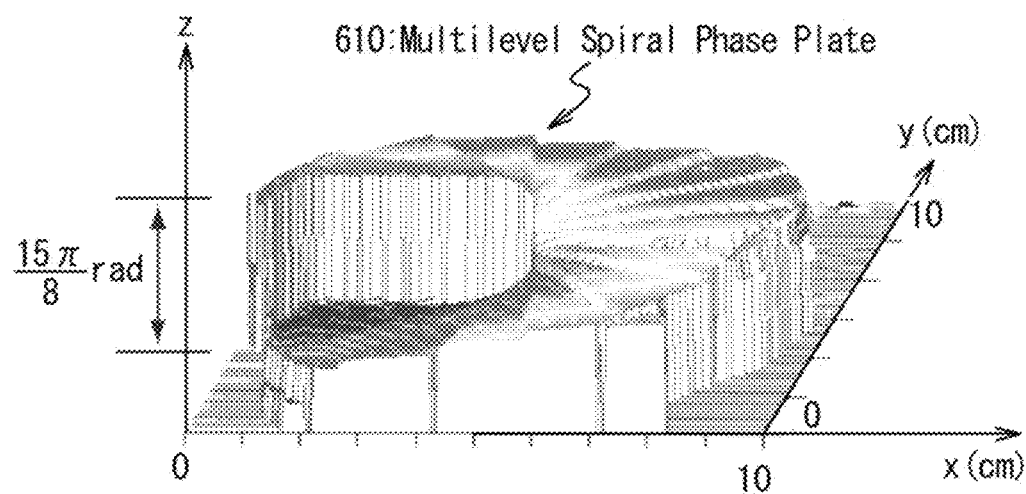
FIG. 9A is a perspective view that shows a configuration example of a sixteen-step spiral phase plate according to an embodiment.

As another variation example of the beam output apparatus 1 shown in FIG. 1, a case where the spiral phase plate 61 is replaced with a multilevel spiral phase plate 610 will be described. FIG. 9A is a perspective view that shows a configuration example of a multilevel spiral phase plate 610 according to an embodiment. The multilevel spiral phase plate 610 shown in FIG. 9A has a function of giving a spiral step-like phase distribution, wherein each step has a fan shape of which bottom surface has a central angle of π/8 radians, and has a shape in which a total of sixteen prisms, that have thicknesses different from each other, are gathered so that each bottom surface is arranged on a same plane and a central angle of each bottom surface is in contact with each other. In addition, in the multilevel spiral phase plate 610 shown in FIG. 9A, a difference between a thickness of each prism with the fan-shape bottom surface and the thickness of the prism with the fan-shape bottom surface of which the thickness is the thinnest is a multiple of π/8 radians, and is distributed within a range from 0 radian to 15π/8 radians. Furthermore, each prism with the fan-shape bottom surface is arranged in an order of thickness thereof to rotate the central angle thereof. In other words, the multilevel spiral phase plate 610 shown in FIG. 9A is obtained by approximating the spirally curbed surface of the spiral phase plate 61 shown in FIG. 2A with a group of a plurality of parallel planes. It is expected that the multilevel spiral phase plate 610 that is configured as above can be manufactured cheaper and easier compared to the spiral phase plate 61 that has a spirally curbed surface. Since the multilevel spiral phase plate 610 shown in FIG. 9A has a total of sixteen different thicknesses, it may be referred to as a sixteen-step spiral phase plate. Although the number of the steps in the example of FIG. 9A is sixteen, it should be noted that this value is merely an example and does not limit the present embodiment.

Figure 9B:
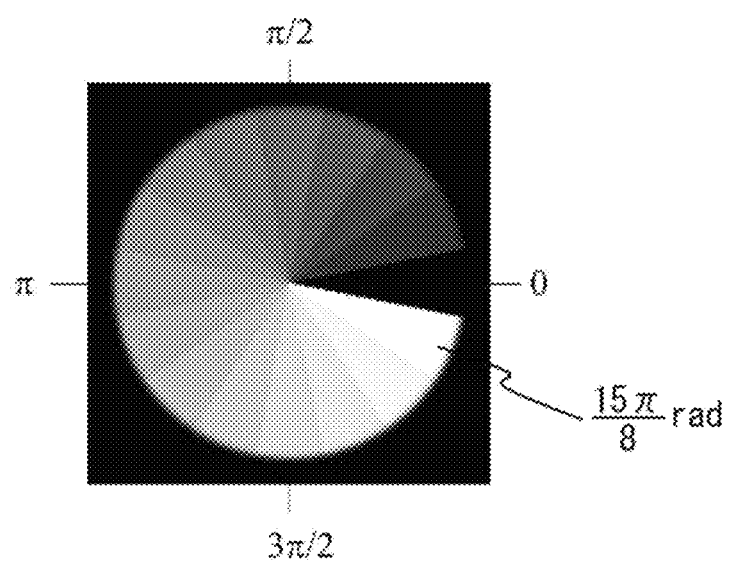
FIG. 9B is a diagram that shows an example of a phase distribution in a cross section that is perpendicular to an optical axis direction of a reference beam that has passed through the multilevel spiral phase plate shown in FIG. 9A.

FIG. 9B is a diagram that shows an example of a phase distribution in a cross section that is perpendicular to an optical axis direction of a reference beam L1 that has passed through the multilevel spiral phase plate 610 shown in FIG. 9A. While in the phase distribution shown in FIG. 2B, that is obtained in the case where the spiral phase plate 61 is used, the phase continuously changes in a direction of rotation around the optical axis, in the phase distribution shown in FIG. 9B, the phase in the phase distribution also changes stepwise at positions where the thickness of the multilevel spiral phase plate 610 changes stepwise. A laser beam that has such a phase distribution will be referred to as a laser beam having a multilevel spiral wavefront, for convenience.

Figure 9C:
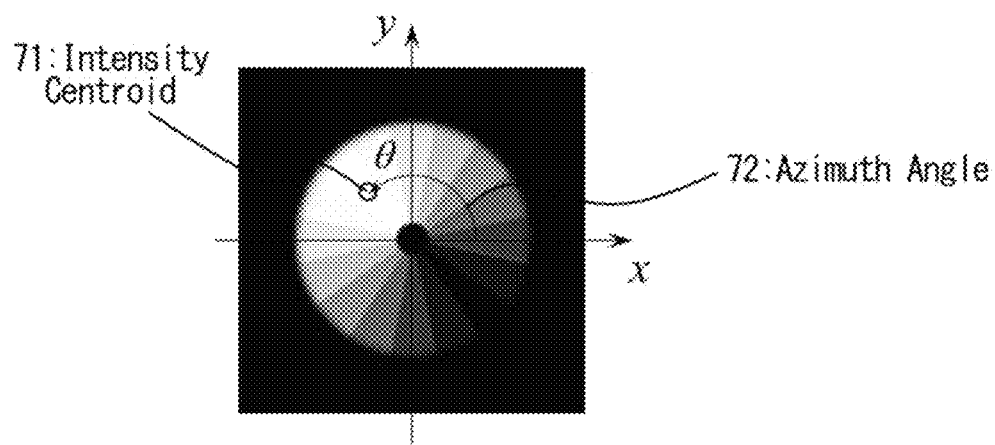
FIG. 9C is a diagram that shows an example of an interference pattern generated by a reference beam that has passed through the multilevel spiral phase plate shown in FIG. 9A and a test beam.

FIG. 9C is a diagram that shows an example of an interference pattern generated by a reference beam that has passed through the multilevel spiral phase plate 610 shown in FIG. 9A and a test beam. While the interference intensity continuously changed in a direction of rotation around an optical axis in the optical intensity distribution of the interference pattern shown in FIG. 4B, that is obtained in case where the spiral phase plate 61 is used, the interference intensity also changes stepwise at positions where the thickness of the multilevel spiral phase plate 610 changes stepwise in the optical intensity distribution of the interference pattern shown in FIG. 9C.

FIG. 9D is a graph that shows an example of a relationship of a measured value of an azimuth angle 72 of an interference pattern intensity centroid 71 obtained by a phase difference measuring device 6 that uses the multilevel spiral phase plate 610 shown in FIG. 9A and a phase difference measurement error, both with respect to an actual phase difference of the test beam with respect to the reference beam that has passed through the multilevel spiral phase plate 610. The graph in FIG. 9D is different in the phase difference measurement error, that is represented by the dotted line, in comparison with the graph shown in FIG. 5. That is, the measurement error shown in FIG. 9D is included in the range from 0 radian to an order of 0.007π radians. Although this range is wider than the measurement error shown in FIG. 5 in the case where the spiral phase plate 61 is used, it can be considered that this range is sufficiently small as a phase difference measurement error. As described above, the measurement of the phase difference between the reference beam L1 and the test beam L2 can be performed with a sufficiently high accuracy even if the spiral phase plate 61 included in the beam output apparatus 1 shown in FIG. 1 is replaced with the multilevel spiral phase plate 610.

Attention should be paid in that the spiral phase plate 61 shown in FIG. 1, the hologram 7 shown in FIG. 8 and the multilevel spiral phase plate 610 shown in FIG. 9A are all a phase conversion device that converts a laser beam that passes therethrough so that a cross section of this laser beam, that is included in an arbitrary virtual plane perpendicular to an optical axis of this laser beam that has passed therethrough, includes a phase distribution of one cycle.

Second Embodiment

Figure 10:
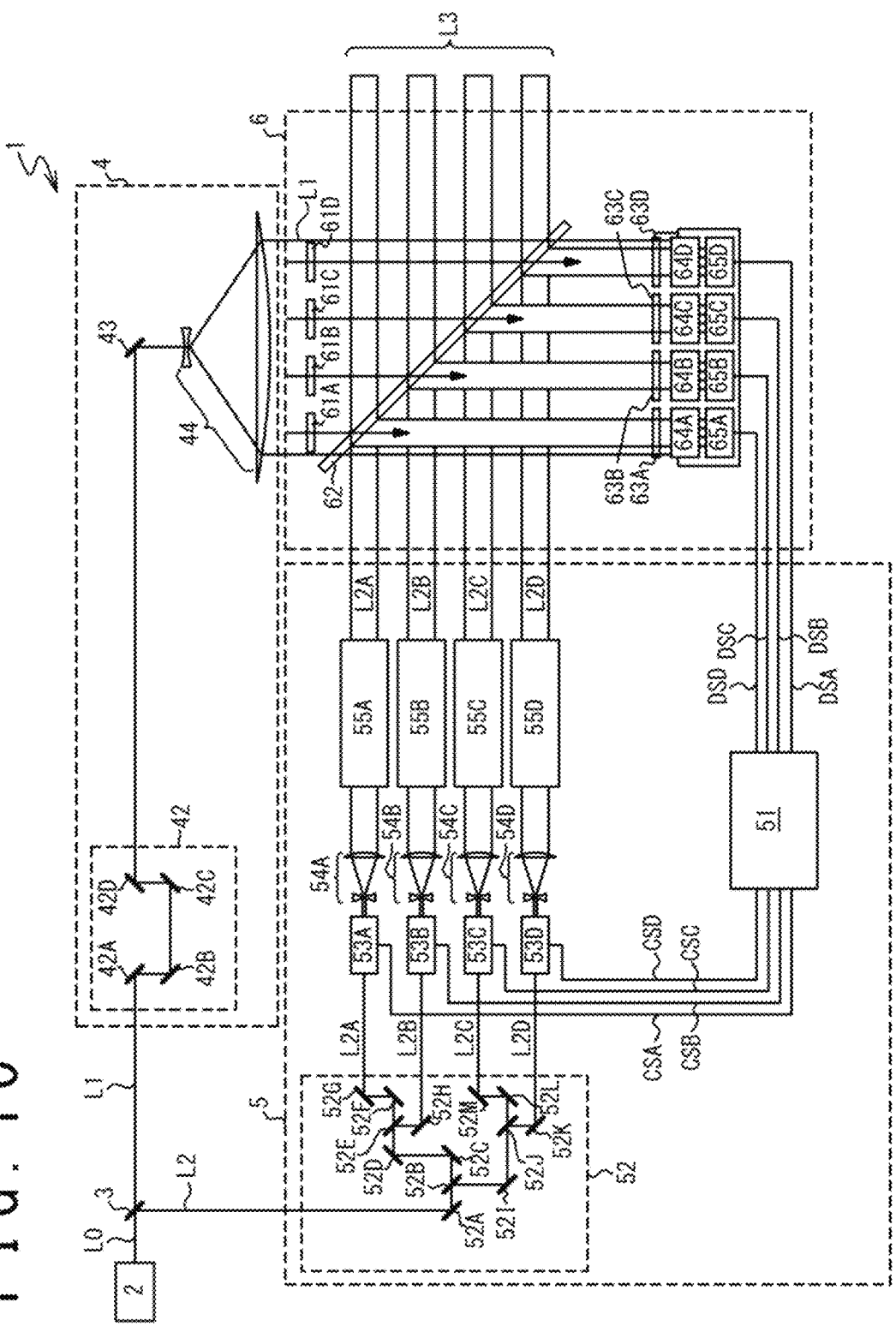
FIG. 10 is a diagram that shows a configuration example of a beam output apparatus according to an embodiment.

A beam output apparatus 1 according to an embodiment will be described with reference to FIG. 10. FIG. 10 is a diagram that shows a configuration example of a beam output apparatus 1 according to an embodiment.

The beam output apparatus 1 according to the present embodiment is approximatively equivalent to an apparatus in that four beam output apparatuses 1 shown in FIG. 1 are prepared and integrated. In other words, the beam output apparatus 1 according to the present embodiment generates a laser beam L0 to be seed light and splits it into a reference beam L1 and a test beam L2, and in addition, splits the test beam L2 into four test beams L2A, L2B, L2C and L2D. A cross-sectional area of the reference beam L1 is enlarged by a beam expander 44, and spiral phase plates 61A, 61B, 61C and 61D are arranged in the enlarged reference beam to equivalently generate four reference beams so as to match optical paths of the test beams L2A, L2B, L2C and L2D that are reflected by the beam splitter 62. Herein, four spiral phase plates 61A, 61B, 61C and 61D may be appropriately arranged so that four reference beams that have respectively passed through the four spiral phase plates 61A, 61B, 61C and 61D have a same phase. Furthermore, the beam output apparatus 1 according to the present embodiment measures four phase differences between four reference beams L1 and four test beams L2, performs a feedback control of the phases of four test beams L2A, L2B, L2C and L2D based on this measurement result via four detector signals DSA, DSB, DSC and DSD and four phase control signals CSA, CSB, CSC and CSD, and outputs a combined beam L3 constituted of components of four test beams L2A, L2B, L2C and L2D that are respectively transmitted through the beam splitter 62.

Components of the beam output apparatus 1 according to the present embodiment will be described. The beam output apparatus 1 in FIG. 10 is provided with a laser oscillator 2, a beam splitter 3, a reference beam generation section 4, a test beam generation section 5 and a phase difference measurement device 6.

The reference beam generation section 4 according to the present embodiment is provided with an optical path length adjustment section 42, a reflector 43 and the beam expander 44. Although the optical path length adjustment section 42 in FIG. 10 is provided with four mirrors 42A, 42B, 42C and 42D, this value is merely an example and does not limit the present embodiment. The beam expander 44 may be configured similarly to the beam expander 44 shown in FIG. 1.

The test beam generation section 5 according to the present embodiment is provided with a controller 51, a beam splitter 52, four phase controllers 53A, 53B, 53C and 53D, four beam expanders 54A, 54B, 54C and 54D, and four amplifiers 55A, 55B, 55C and 55D. When four beam expanders 54A, 54B, 54C and 54D are not distinguished, they will be simply referred to as beam expanders 54. When four amplifiers 55A, 55B, 55C and 55D are not distinguished, they will be simply referred to as amplifiers 55.

The phase difference measurement device 6 according to the present embodiment is provided with four spiral phase plates 61A, 61B, 61C and 61D that have a same material and a same thickness; a beam splitter 62; four apertures 63A, 63B, 63C and 63D; four four-quadrant detectors 64A, 64B, 64C and 64D; and four processors 65A, 65B, 65C and 65D. When four spiral phase plates 61A, 61B, 61C and 61D are not distinguished, they will be simply referred to as spiral phase plates 61. When four apertures 63A, 63B, 63C and 63D are not distinguished, they will be simply referred to as apertures 63. When four four-quadrant detectors 64A, 64B, 64C and 64D are not distinguished, they will be simply referred to as four-quadrant detectors 64. When four processors 65A, 65B, 65C and 65D are not distinguished, they will be simply referred to as processors 65.

It will be described that the optical path length adjustment section 42 can adjust an optical path length of the reference beam L1. The optical path length adjustment section 42 receives the reference beam L1 outputted from the beam splitter 3, reflects it by use of four mirrors 42A, 42B, 42C and 42D in this order, and outputs it to the reflector 43. At that time, for example, by fixing the mirrors 42A and 42D, and by appropriately moving the positions of the mirrors 42B and 42C, the length of the optical path through which the reference beam L1 passes via the mirrors 42A 42B, 42C and 42D can be adjusted, and a difference of optical path length between the reference beam L1, that is included in the detection beam L4 that arrives to the four-quadrant detector 64, and the test beam L2 can be brought closer to zero.

Specifically, when the laser beam L0 is a pulsed wave, it is preferable that this optical path length difference is shorter than a distance obtained by multiplying 1/10 of a pulse time width by the speed of light. It should be noted that, when the laser beam L0 is a continuous wave, it is preferable that this optical path length difference is shorter than a fraction of a coherence length and it is more desirable that this optical path length difference is shorter than 1/10 of the coherence length.

The beam splitter 52 is a splitting device that splits the test beam L2 into a plurality of test beams L2A, L2B, L2C and L2D. The beam splitter 52 is provided with mirrors 52A, 52C, 52D, 52F, 52G, 52H, 52I, 52K, 52L and 52M, and half mirrors 52B, 52E and 52J. In the example of FIG. 10, a part of the test beam L2 outputted from the beam splitter 3 is reflected or transmitted by the mirror 52A, the half mirror 52B, the mirrors 52C, 52D, the half mirror 52E, the mirrors 52F and 52G in this order and arrives to the phase controller 53A as the test beam L2A. In addition, a part of the test beam L2 outputted from the beam splitter 3 is reflected or transmitted by the mirror 52A, the half mirror 52B, the mirrors 52C. 52D, the half mirror 52E, and the mirror 52H in this order and arrives to the phase controller 53B as the test beam L2B. In addition, a part of the test beam L2 outputted from the beam splitter 3 is reflected or transmitted by the mirror 52A, the half mirror 52B, the mirror 52I, the half mirror 523, and the mirrors 52L and 52M in this order and arrives to the phase controller 53C as the test beam L2C. In addition, a part of the test beam L2 outputted from the beam splitter 3 is reflected or transmitted by the mirror 52A, the half mirror 52B, the mirror 52I, the half mirror 52J, and the mirror 52K in this order and arrives to the phase controller 53D as the test beam L2D.

The test beam L2A arrives to the four-quadrant detector 64A via the phase controller 53A, the beam expander 54A, the amplifier 55A, and the beam splitter 62. The test beam L2B arrives to the four-quadrant detector 64B via the phase controller 53B, the beam expander 54B, the amplifier 55B, and the beam splitter 62. The test beam L2C arrives to the four-quadrant detector 64C via the phase controller 53C, the beam expander 54C, the amplifier 55C, and the beam splitter 62. The test beam L2D arrives to the four-quadrant detector 64D via the phase controller 53D, the beam expander 54D, the amplifier 55D, and the beam splitter 62.

A part of the reference beam L1 outputted from the beam expander 44 passes through the spiral phase plate 61A, the beam splitter 62, and the aperture 63A and arrives to the four-quadrant detector 64A. Another part of the reference beam L1 outputted from the beam expander 44 passes through the spiral phase plate 61B, the beam splitter 62, and the aperture 63B and arrives to the four-quadrant detector 64B. A still another part of the reference beam L1 outputted from the beam expander 44 passes through the spiral phase plate 61C, the beam splitter 62, and the aperture 63C and arrives to the four-quadrant detector 64C. A still another part of the reference beam L1 outputted from the beam expander 44 passes through the spiral phase plate 61D, the beam splitter 62, and the aperture 63D, and arrives to the four-quadrant detector 64D.

Since the four-quadrant detectors 64, the processors 65, and the controllers 51 are same as the case in FIG. 1, further detailed descriptions thereof will be omitted.

Figure 11:
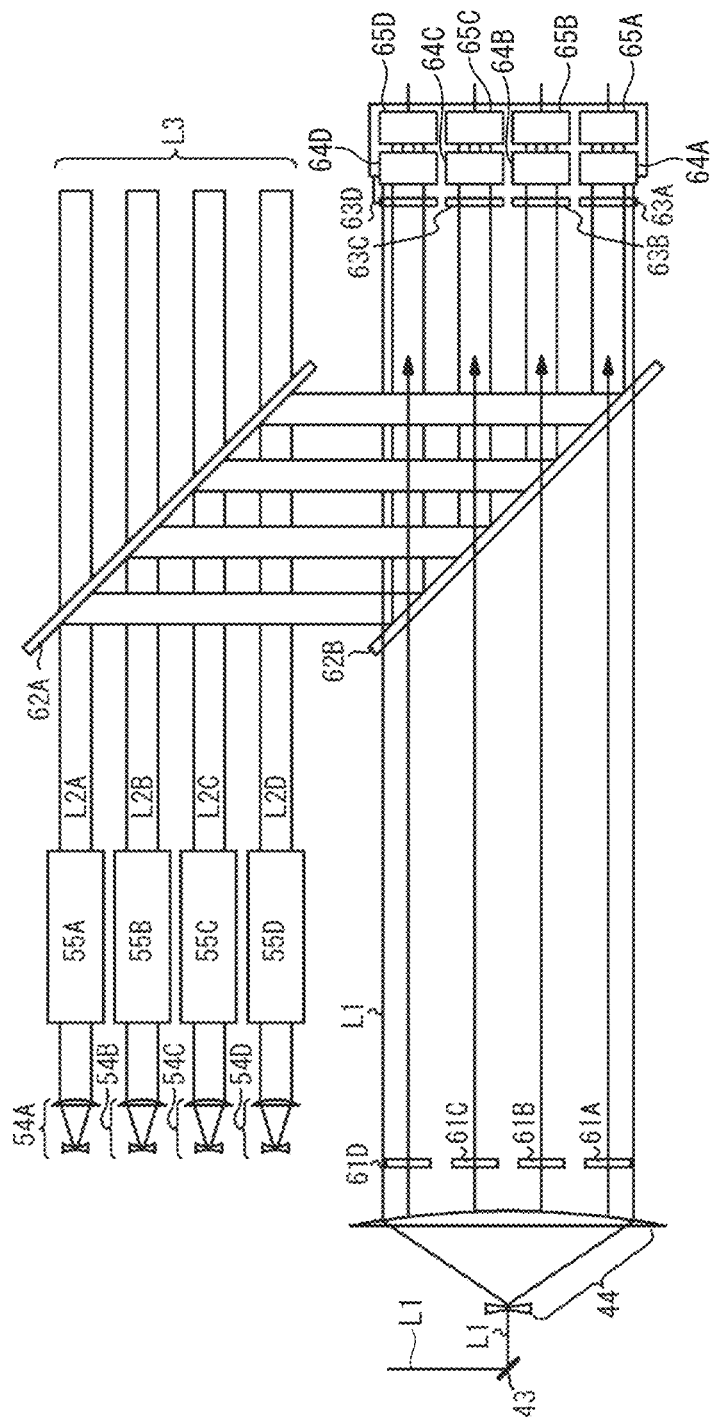
FIG. 11 is a diagram that partially shows a configuration example of a beam output apparatus according to an embodiment.

A variation example of the beam output apparatus 1 shown in FIG. 10 will be described with reference to FIG. 11. FIG. 11 is a diagram that partially shows a configuration example of the beam output apparatus 1 according to an embodiment.

The beam output apparatus 1 in FIG. 11 is obtained by adding following changes to the beam output apparatus 1 in FIG. 10. That is, two beam splitters 62A and 62B are used instead of the beam splitter 62 in FIG. 10. At first, the arrangement of the beam expander 54 and the amplifier 55 is adjusted so that the test beams L2A to L2D becomes parallel to each other. Next, the arrangement of the beam expander 44 and the parallelism of the beam splitters 62A and 62B are adjusted so that the optical axes of the reference beam L1 and the test beams L2 become parallel. Furthermore, the test beams L2 outputted from the amplifiers 55 are made incident to the four-quadrant detectors 64 via two beam splitters 62A and 62B.

In the configuration example of FIG. 11, the test beams L2 can be significantly dimmed because the number of the beam splitters is increased compared to the case of FIG. 10. In other words, if a ratio for dimming an optical intensity of the test beams L2 outputted from the amplifiers 55 to an optical intensity that the sensor of the four-quadrant detector 64 can withstand is larger, the optical intensity of the combined beam L3 can be made higher.

In addition, in the configuration example of FIG. 11, the component of the reference beam L1 that is not transmitted by the beam splitter 62B can be outputted to a direction different from the combined beam L3. Therefore, since the reference beam L1 is not mixed in the combined beam L3 at all, in can be expected that the quality of the combined laser beam is further improved.

Third Embodiment

Figure 12:
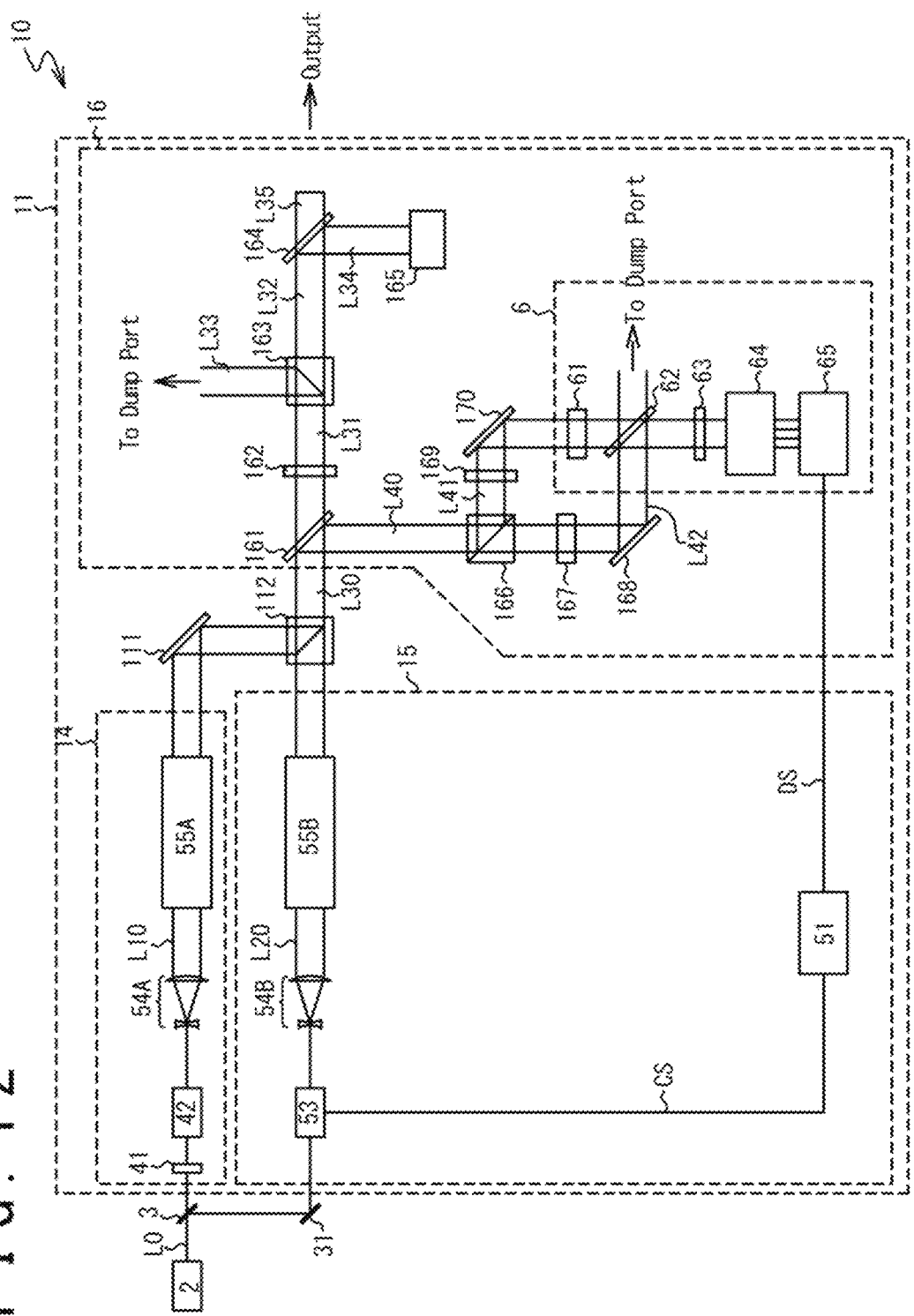
FIG. 12 is a diagram that shows a configuration example of a beam output apparatus according to an embodiment.

A beam output apparatus 10 according to an embodiment will be described with reference to FIG. 12. FIG. 12 is a diagram that shows a configuration example of a beam output apparatus 10 according to an embodiment that combines two beams on a same optical path.

The beam output apparatus 10 according to the present embodiment generates a high-power and high-quality laser beam by splitting the laser beam L0 to be seed light by the beam splitter 3 into a first beam L10 and a second beam L20, amplifying both the first beam L10 and the second beam L20 and combining them, measuring the inter-beam phase difference between the first beam L10 and the second beam L20, and performing a feedback control of the phase of the second beam L20 to match the phase of the first beam L10. It should be noted that the target of the matching may be another phase obtained by adding a predetermined phase difference to the phase of the first beam L10.

Components of the beam output apparatus 10 according to the present embodiment will be described. The beam output apparatus 10 of FIG. 12 is provided with a laser oscillator 2, a beam splitter 3, a mirror 31, and a beam combination unit 11. The beam combination unit 11 is provided with a first beam generation section 14, a second beam generation section 15, a mirror 111, a polarizing beam splitter 112, and a phase difference measuring device 16.

The first beam generation section 14 is provided with a half-wave plate 41, an optical path length adjustment section 42, a beam expander 54A, and an amplifier 55A.

The second beam generation section 15 is provided with a controller 51, a phase controller 53, a beam expander 54B, and an amplifier 55B.

The phase difference measuring device 16 is provided with a beam splitter 161, a half-wave plate 162, a polarizing beam splitter 163, a beam splitter 164, a power monitor 165, a polarizing beam splitter 166, an optical path length adjustment section 167, a mirror 168, a half-wave plate 169, a mirror 170, and a phase difference measuring device 6. Since the configuration of the phase difference measuring device 6 is the same as in the case of FIG. 1, further detailed description thereof will be omitted.

Operations of the components of the beam output apparatus 10 according to the present embodiment will be described. Herein, since components with symbols that are same as the beam output apparatus 1 shown in FIG. 1 and/or the beam output apparatus 1 shown in FIG. 10 operate in a same way, detailed description thereof may be omitted.

The laser oscillator 2 outputs the laser beam L0 that is to be seed light. The beam splitter 3 splits the laser beam L0 into the first beam L10 and the second beam L20.

The first beam generation section 14 receives, amplifies, and outputs the first beam L10. Herein, at first, the half-wave plate 41 rotates the linear polarization direction of the first beam L10 of $\pi/2$ radians. Next, when the laser beam L0 is a pulse wave, the optical path length adjustment section 42 adjusts the optical path length difference between the first beam L10 and the second beam L20 at the polarizing beam splitter 112 to be a distance shorter than a distance obtained by multiplying 1/10 of the pulse time width by the speed of light. Alternatively, when the laser beam L0 is a continuous wave, the optical path length adjustment section 42 adjusts the optical path length difference between the first beam L10 and the second beam L20 at the polarizing beam splitter 112 to be a distance shorter than a fraction of the coherence length. Next, the beam expander 54A enlarges the cross-sectional area of the first beam L10. Next, the amplifier 55A amplifies the optical intensity of the first beam L10.

The second beam generation section 15 receives the second beam L20 via the mirror 31, amplifies it and outputs it. Herein, at first, the controller 51 generates the phase control signal CS based on the detector signal DS supplied from the phase difference measuring device 6. Next, the phase controller 53 adjusts the phase of the second beam L20 based on the phase control signal CS. Next, the beam expander 54B enlarges the cross-sectional area of the second beam L20. Next, the amplifier 55B amplifies the optical intensity of the second beam L20.

Herein, attention should be paid in that the linear polarization directions are perpendicular between the first beam L10 outputted from the first beam generation section 14 and the second beam L20 outputted from the second beam generation section 15. Herein, it will be described an example with a supposition in that the first beam L10 is s-polarized with respect to the polarizing beam splitter 112 and the second beam L20 is p-polarized, and a supposition in that the intensities of the first beam L10 and the second beam L20 are the same.

The polarized beam splitter 112 combines the first beam L10, that is outputted from the first beam generation section 14 and reflected by the mirror 111, and the second beam L20, that is outputted from the second beam generation section 15, and outputs the combined beam L30. At that time, the combined beam L30 includes a component derived from the s-polarized first beam L10 and a component derived from the p-polarized second beam L20. That is, when the phases of the s-polarized beam and the p-polarized beam are the same, the combined beam is linear-polarized with an inclination of 45 degrees, and is elliptically polarized or circularly polarized in other cases.

The phase difference measuring device 16 receives the combined beam L30 outputted from the polarizing beam splitter 112, measures the phase difference between the first beam L10 and the second beam L20 both included the combined beam L30, outputs the detector signal DS for performing the feedback control to the phase of the second beam L20 based on the result of this measurement, and gives, to the combined beam L30, linear polarization and polarization angle that are appropriate to the polarizing beam splitter 163, as a result of the phase feedback control.

Herein, at first, the beam splitter 161 splits the combined beam L30 into a combined beam L31 and a detection beam L40. Next, the half-wave plate 162 rotates respective polarization directions of the s-polarized component and the p-polarized component of the combined beam L30 of 45 degrees. As a result, the linear polarization direction, or a main axis direction of the ellipse in case of elliptical polarization, of the combined beam L31 of which the polarization has been rotated, matches the p-polarization of the polarizing beam splitter 163, and the output beam L32 is obtained. At that time, when the combined beam L31, of which the polarization has been rotated, is elliptically polarized, the component, that is s-polarized with respect to the polarizing beam splitter 163, of the polarized component of the combined beam L31, of which the polarization has been rotated, is outputted to the dump port as the dump beam L33. Next, the beam splitter 164 takes out a part of the output beam L32 as a monitor beam L34 and the power monitor 165 monitors the optical intensity of the output beam L35. It should be noted that, when the beam splitter 164 splits, a most part (for example: more than 99%) of the output beam L32 may be transmitted as the output beam L35, and a slight part (for example: less than 1%) of the output beam L32 may be split as the monitor beam L34. At that time, when the phases of the s-polarized beam and the p-polarized beam are the same just after the polarizing beam splitter 112, the power received by the power monitor 165 becomes maximal.

Next, the polarizing beam splitter 166 splits the detection beam L40, that is split by the beam splitter 161, into a s-polarized first detection beam L41 (a part of the first beam L10 included in the combined beam L30, obtained as a detection beam) and a p-polarization second detection beam L42 (a part of the second beam L20 included in the combined beam L30, obtained as a detection beam). Next, the half-wave plate 169 rotates the linear polarization direction of the s-polarized first detection beam L41 of 90 degrees, and outputs the p-polarized first detection beam L41. Next, the first detection beam L41 is inputted to the four-quadrant detector 64 of the phase difference measuring device 6, via the mirror 170, the spiral phase plate 61, the beam splitter 62, and the aperture 63. On the other hand, the second detection beam L42 is also inputted to the four-quadrant detector 64 of the phase difference measuring device 6, via the optical path length adjustment section 167, the mirror 168, the beam splitter 62, and the aperture 63. Herein, attention should be paid in that the linear polarization directions of the first detection beam L41 and the second detection beam L42 at the four-quadrant detector 64 are the same, and therefore a visibility of the interference pattern generated by the first detection beam L41 and the second detection beam L42 becomes higher. It should be noted that the beam splitter 62 in the embodiment shown in FIG. 12 may be a half mirror.

Since subsequent operations of the four-quadrant detector 64, the processor 65 and the controller 51 are the same as in the case of each of above-described embodiments, further detailed description will be omitted.

As described above, since the beam output apparatus 10 according to the present embodiment can split the laser beam L0 that is to be seed light into two laser beams, amplify each of the split laser beams by two amplifiers 55A and 55B, and use a most part thereof as the output beam L35 on an identical optical path, it is expected that a high-power laser beam, that is a combination of two to the power of n (n is an integer) beams on an identical optical path, can be generated by a deduction of a plurality of combinations. Herein, attention should be paid in that the tile-like combination shown in FIG. 10 and the filled-aperture combination shown in FIG. 12 are of different embodiments.

Figure 13:
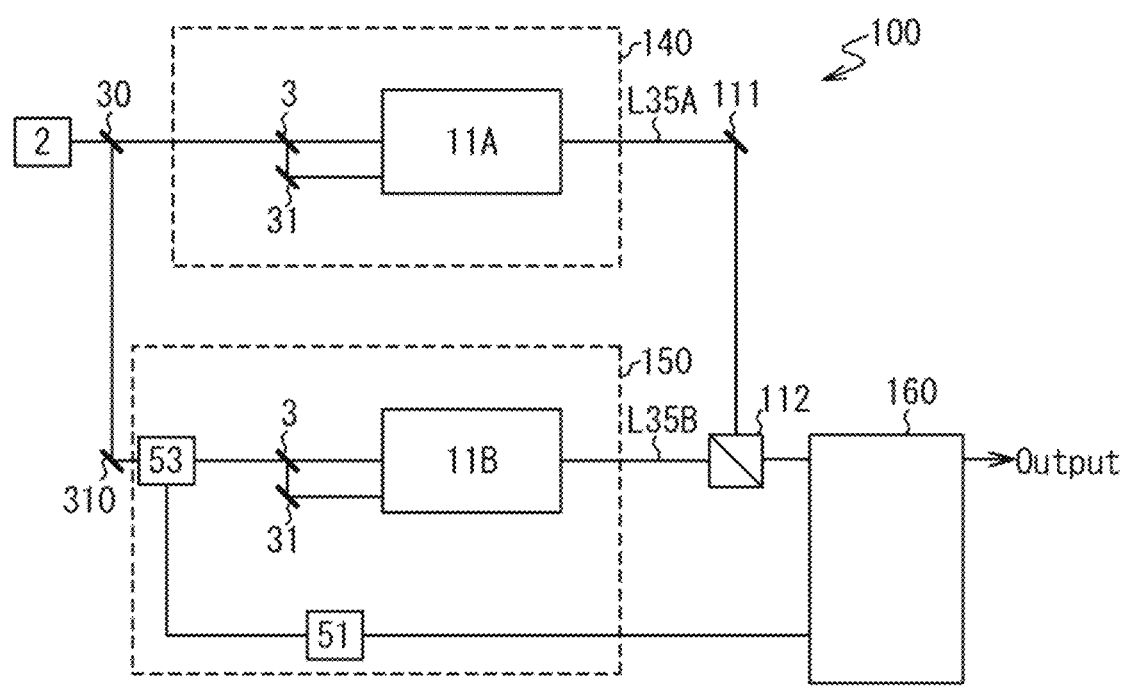
FIG. 13 is a diagram that shows a configuration example of a beam output apparatus according to an embodiment.

A variation example of the beam output apparatus 10 according to the present embodiment will be described with reference to FIG. 13. FIG. 13 is a diagram that shows a configuration example of a beam output apparatus 100 according to an embodiment.

The beam output apparatus 100 in FIG. 13 is provided with two beam output apparatuses 10 in FIG. 12, measures a phase difference between two combined beams L35A and L35B outputted from those two beam output devices 140 and 150, performs a feedback control of a phase of one combined beam L35B, and can combine two combined beams L35A and L35B with matched phases.

Components of the beam output apparatus 100 in FIG. 13 will be described. The beam output apparatus 100 is provided with a laser oscillator 2, a beam splitter 30, a mirror 310, a first beam output device 140, a second beam output device 150, a mirror 111, a polarizing beam splitter 112, and a phase difference measuring device 160 for measuring a phase difference between a first combined beam L35A and a second combined beam L35B.

The first beam output device 140 is provided with a beam splitter 3, a mirror 31, and a beam combination unit 11A.

The second beam output device 150 is provided with a controller 51 for controlling the phase of the second combined beam L35B, a phase controller 53, a beam splitter 3, a mirror 31, and a beam combination unit 11B.

An operation of the beam output apparatus 100 in FIG. 13 will be described. The beam output apparatus 100 in FIG. 13 operates in a same way as the beam output apparatus 10 in FIG. 12. At first, the laser oscillator 2, the beam splitter 30, and the mirror 310 in FIG. 13 correspond to the laser oscillator 2, the beam splitter 3, and the mirror 31 in FIG. 12, respectively. Next, each of the first beam output device 140 and the second beam output device 150 in FIG. 13 is provided with the beam combination unit 11 in FIG. 12. In the example of FIG. 13, the configuration that is provided to the first beam output device 140 and corresponds to the beam combination unit 11 in FIG. 12 is shown as a beam combination unit 11A, and the configuration that is provided to the second beam output device 150 and corresponds to the beam combination unit 11 in FIG. 12 is shown as a beam combination unit 11B. Next, the mirror 111, the polarizing beam splitter 112, and the phase difference measuring device 160 in FIG. 13 correspond to the mirror 111, the polarizing beam splitter 112, and the phase difference measuring device 16 in FIG. 12, respectively. In addition, the beam splitter 3 and the mirror 31 in FIG. 13 correspond to the beam splitter 3 and the mirror 31 in FIG. 12, and the controller 51 and the phase controller 53 in FIG. 13 have same functions as the controller 51 and the phase controller 53 in FIG. 12, respectively.

More specifically, at first, each of the two beam combination units 11A and 11B operates in a same way as the beam combination unit 11 in FIG. 12. That is, each unit splits an inputted laser beam into two beams by use of the beam splitter 3, amplifies each of those two laser beams, measures the phase difference between the two amplified laser beams, performs a feedback control of the phase of one of the laser beams based on the result of this measurement, and outputs a beam that is a combination of the two laser beams with matched phases.

Next, the polarizing beam splitter 112 and the phase difference measurement device 160 operate in same ways as the polarizing beam splitter 112 and the phase difference measurement device 16 in FIG. 12. That is, the polarizing beam splitter 112 in FIG. 13 outputs a third combined beam that is a combination of a first combined beam, that is outputted from the beam combination unit 1A and arrives via the mirror 111, and a second combined beam that is outputted from the beam combination unit 11B. In addition, the phase difference measuring device 160 measures a phase difference between at least a part of the first combined beam and at least a part of the second combined beam that are included in the third combined beam, and generates a detector signal for performing a feedback control of the phase of the second combined beam based on the result of this measurement. The controller 51 generates the phase control signal based on this detector signal, and the phase controller 53 controls the phase of the laser beam that arrives via the mirror 310 based on this phase control signal.

As described above, by making the configuration of the beam output apparatus 10 in FIG. 12 a recursive nesting structure (tree structure), the beam output apparatus 100 in FIG. 13 can split the laser beam L0 into four beams to amplify each of them separately, match the phases thereof, and combine. Furthermore, by making the configuration of the beam output apparatus 100 in FIG. 13 a recursive nesting structure, the laser beam L0 can be split into eight beams, each of which is separately amplified, matched in phases, and combined. Similarly, by repeating the recursive nesting structure, the laser beam L0 can be split into two to power of an arbitrary number, each of which is separately amplified, matched in phases, and combined, and therefore a laser beam with higher power and higher quality can be generated.

Although the invention made by the inventors has been specifically described above based on the embodiments, it is needless to say that the present invention is not limited to the above-described embodiments and can be variously modified within a range of not departing from the gist thereof. In addition, each feature described in the above-described embodiments may be freely combined within a range of a technical consistence.

The phase difference measuring device 6 according to each embodiment is understood for example as below.

(1) A phase difference measuring device 6 according to a first aspect is provided with a phase conversion device 61, 7, 610 and a detection device 60.

There is an effect in that the phase difference measuring device 6 according to the first aspect can measure an inter-beam phase difference of a test beam with respect to a reference beam and adjust it, by use of the phase conversion device 61, 7, 610 and the detection device 60.

The phase conversion device 61, 7, 610 has a function of converting a first laser beam L1 that passes therethrough so that the first laser beam L1 includes a phase distribution of one cycle in an azimuth direction in a cross section of the first laser beam L1 that has passed therethrough included in an arbitrary virtual plane perpendicular to an optical axis of the first laser beam L1. As a device that converts the phase distribution in such a way, there is an optical device such that a phase of a transmitted beam is different according to a part of the laser beam that passes therethrough. As such an optical device, there are a spiral phase plate 61, a hologram 7 corresponding to the spiral phase plate 61, a multilevel spiral phase plate 610, or the like. In other words, the phase conversion device 61, 7, 610 represents a superordinate concept of the spiral phase plate 61, the hologram 7, and the multilevel spiral phase plate 610.

The detection device 60 has a function of detecting an azimuth angle 72 of an intensity centroid 71 of an interference pattern and detecting an inter-beam phase difference of a second laser beam L2 with respect to the first laser beam L1 based on the azimuth angle 72. The interference pattern is generated by a shaped detection beam L5 obtained by cutting out a part of a cross section of a detection beam L4 into a shape of a circle with a point, where the cross section of the detection beam L4 and an optical axis of the phase conversion device 61, 7, 610 intersect, as a center thereof. The cross section of the detection beam is perpendicular to an optical axis A4 of the detection beam L4. The detection beam L4 is obtained by combining a reference beam L12 that is a first partial intensity laser beam and a test beam L22 that is a second partial intensity laser beam on a same optical path. The first partial intensity laser beam has at least a part of an intensity component of the first laser beam L1 that has passed through the phase conversion device 61, 7, 610. The second partial intensity laser beam has at least a part of an intensity component of the second laser beam L2 derived from a laser beam L0 as seed light from which the first laser beam L1 derives. As a device having such a function, there is a four-quadrant detector 64 provided with four sensors, that detect optical intensities $P_1$, $P_2$, $P_3$ and $P_4$ that are respectively included in four quadrants of the interference pattern, or the like.

(2) A phase difference measuring device 6 according to a second aspect is the phase difference measuring device 6 according to the first aspect, and is further provided with a sensor device 64 and a processor 65. As a result, there is an effect in that, since the optical intensities $P_1$, $P_2$, $P_3$ and $P_4$ included in a plurality of areas included in the interference pattern can be respectively detected, the azimuth angle 72 of the interference pattern intensity centroid 71 can be calculated based on the detection result, and the inter-beam phase difference can be calculated based on the azimuth angle 72, a detection of the inter-beam phase difference can be realized by fewer sensors and with higher accuracy. Such optical intensities $P_1$, $P_2$, $P_3$ and $P_4$ may be the optical intensities $P_1$, $P_2$, $P_3$ and $P_4$ of the four quadrants of the interference pattern.

(3) a phase difference measuring device 6 according to a third aspect is the phase difference measuring device 6 according to the second aspect, and is further provided with a four-quadrant detector 64. As a result, there is an effect in that the detection of the azimuth angle can be realized by four sensors with high accuracy.

(4) The phase difference measuring device 6 according to a fourth aspect is the phase difference measuring device 6 according any one of the first to third aspects, and is further provided with the spiral phase plate 61. As a result, there is an effect in that, once the optical intensities $P_1$, $P_2$, $P_3$ and $P_4$ respectively included in four quadrants of the interference pattern are detected, the desired inter-beam phase difference to measure can be corresponded to a specific phase in the phase distribution of one cycle included in the cross section of the reference beam.

(5) A phase difference measuring device 6 according to a fifth aspect is the phase difference measuring device 6 according to any one of the first to third aspects, and is further provided with the hologram 7 of the spiral phase plate 61. As a result, there is an effect in that, once the optical intensities $P_1$, $P_2$, $P_3$ and $P_4$ respectively included in four quadrants of the interference pattern are detected, the desired inter-beam phase difference to measure can be corresponded to a specific phase in the phase distribution of one cycle included in the cross section of the reference beam, in an easier way than the case of using the spiral phase plate 61 itself.

(6) A phase difference measuring device 6 according to a sixth aspect is the phase difference measuring device 6 according to any one of the first to third aspects, and is further provided with the multilevel spiral phase plate 610. As a result, there is an effect in that, once the optical intensities $P_1$, $P_2$, $P_3$ and $P_4$ respectively included in four quadrants of the interference pattern are detected, the desired inter-beam phase difference to measure can be corresponded to a specific phase in the phase distribution of one cycle included in the cross section of the reference beam, in an easier way than the case of using the spiral phase plate 61 itself.

(7) A beam output apparatus 1, 10, 100 according to a first aspect is provided with a first beam splitter 3, 30, a phase conversion device 61, 7, 610, a detection device 60, and a phase controller 53.

There is an effect in that the beam output apparatus 1, 10, 100 can generate a high-power and high-quality laser beam by use of the first beam splitter 3, 30, the phase conversion device 61, 7, 610, the detection device 60, and the phase controller 53.

The first beam splitter 3, 30 has a function of splitting a laser beam L0 that is to be seed light into a first laser beam L1 and a second laser beam L2.

The phase conversion device 61, 7, 610 has a function of converting a first laser beam L1 that passes therethrough so that the first laser beam L1 includes a phase distribution of one cycle in an azimuth direction in a cross section of the first laser beam L1 that has passed therethrough included in an arbitrary virtual plane perpendicular to an optical axis of the first laser beam L1. As a device that converts the phase distribution in such a way, there is an optical device such that a phase is different according to a part of the laser beam that passes therethrough. As such an optical device, there are a spiral phase plate 61, a hologram 7 corresponding to the spiral phase plate 61, a multilevel spiral phase plate 610, or the like.

The detection device 60 has a function of detecting an azimuth angle 72 of an intensity centroid 71 of an interference pattern and detecting an inter-beam phase difference of a second laser beam L2 with respect to the first laser beam L1 based on the azimuth angle 72. The interference pattern is generated by a shaped detection beam L5 obtained by cutting out a part of a cross section of a detection beam L4 into a shape of a circle with a point, where the cross section of the detection beam L4 and an optical axis of the phase conversion device 61, 7, 610 intersect, as a center thereof. The cross section of the detection beam is perpendicular to an optical axis A4 of the detection beam L4. The detection beam L4 is obtained by combining a reference beam L12 that is a first partial intensity laser beam and a test beam L22 that is a second partial intensity laser beam on a same optical path. The first partial intensity laser beam has at least a part of an intensity component of the first laser beam L1 that has passed through the phase conversion device 61, 7, 610. The second partial intensity laser beam has at least a part of an intensity component of the second laser beam L2. As a device having such a function, there is a four-quadrant detector 64 provided with four sensors, that detect optical intensities $P_1$, $P_2$, $P_3$ and $P_4$ that are respectively included in four quadrants of the interference pattern, or the like.

The phase controller 53 has a function of controlling the phase of the second laser beam L2 based on the measured value of the azimuth angle 72. As a result, when combining the first laser beam L1 as a phase reference and the second laser beam L2, the inter-beam phase difference between the both beams can be adjusted. As a device having such a function, there is a phase controller that can adjust the phase of the laser beam that passes therethrough.

(8) A beam output apparatus 1, 10, 100 according to a second aspect is the beam output apparatus 1, 10, 100 according to the first aspect and is further provided with a sensor device 64 and a processor 65. As a result, there is an effect in that, since the optical intensities $P_1$, $P_2$, $P_3$ and $P_4$ included in a plurality of areas included in the interference pattern can be respectively detected, the azimuth angle 72 of the interference pattern intensity centroid 71 can be calculated based on the detection result, and the inter-beam phase difference can be calculated based on the azimuth angle 72, a detection of the inter-beam phase difference can be realized by fewer sensors and with higher accuracy. Such optical intensities $P_1$, $P_2$, $P_3$ and $P_4$ may be the optical intensities $P_1$, $P_2$, $P_3$ and $P_4$ of the four quadrants of the interference pattern. In addition, as a device having such a function, there is a four-quadrant detector 64 or the like.

(9) A beam output apparatus 1, 10, 100 according to a third aspect is the beam output apparatus 1, 10, 100 according to the second aspect, and is further provided with a four-quadrant detector 64. As a result, there is an effect in that the detection of the azimuth angle 72 can be realized by four sensors with high accuracy.

(10) A beam output apparatus 1, 10, 100 according to a fourth aspect is the beam output apparatus 1, 10, 100 according to any one of the first to third aspects, and is further provided with the spiral phase plate 61. As a result, there is an effect in that, once the optical intensities $P_1$, $P_2$, $P_3$ and $P_4$ respectively included in four quadrants of the interference pattern are detected, the desired inter-beam phase difference to measure can be corresponded to a specific phase in the phase distribution of one cycle included in the cross section of the reference beam.

(11) A beam output apparatus 1, 10, 100 according to a fifth aspect is the beam output apparatus 1, 10, 100 according to any one of the first to third aspects, and is further provided with the hologram 7 of the spiral phase plate 61. As a result, there is an effect in that, once the optical intensities $P_1$, $P_2$, $P_3$ and $P_4$ respectively included in four quadrants of the interference pattern are detected, the desired inter-beam phase difference to measure can be corresponded to a specific phase in the phase distribution of one cycle included in the cross section of the reference beam, in an easier way than the case of using the spiral phase plate 61 itself.

(12) A beam output apparatus 1, 10, 100 according to a sixth aspect is the beam output apparatus 1, 10, 100 according to any one of the first to third aspects, and is further provided with the multilevel spiral phase plate 610. As a result, there is an effect in that, once the optical intensities $P_1$, $P_2$, $P_3$ and $P_4$ respectively included in four quadrants of the interference pattern are detected, the desired inter-beam phase difference to measure can be corresponded to a specific phase in the phase distribution of one cycle included in the cross section of the reference beam, in an easier way than the case of using the spiral phase plate 61 itself.

(13) A beam output apparatus 1, 10, 100 according to a seventh aspect is the beam output apparatus 1, 10, 100 according to any one of the first to sixth aspects and is further provided with an amplifier 55. The amplifier 55 amplifies the second laser beam L2. As a result, there is an effect in that a laser beam with a high quality and a higher power can be generated.

(14) A beam output apparatus 1, 10, 100 according to an eighth aspect is the beam output apparatus 1, 10, 100 according to the first to seventh aspects and is further provided with a splitting device 52 and a plurality of amplifiers 55. The splitting device 52 has a function of splitting the second laser beam L2 into a plurality of test beams L2A, L2B, L2C and L2D that are a plurality of second partial intensity laser beams, each of which has a part of intensity component of the second laser beam L2. As a device that has such a function, there is a combination 52 of mirrors and half mirrors, or the like. The plurality of amplifiers 55 respectively amplify the plurality of test beams (the second partial intensity laser beams) L2A, L2B, L2C and L2D. The phase conversion device 61A, 61B, 61C and 61D according to the eighth aspect includes a plurality of phase conversion devices 61A, 61B, 61C and 61D that are arranged so that a plurality of first partial cross section laser beams, that are obtained by cutting out the first laser beam L1 by parts of beam cross sections, respectively pass therethrough. Each of the plurality of phase conversion devices 61A, 61B, 61C and 61D has a function of converting each of the plurality of first partial cross section laser beams that passes therethrough, so that the each first partial cross section laser beam includes a phase distribution of one cycle in an azimuth direction in a cross section of the each first partial cross section laser beam that has passed therethrough included in an arbitrary virtual plane perpendicular to an optical axis of the each first partial cross section laser beam. The detection device 60 according to the eighth aspect has a function of detecting an azimuth angle 72 of an intensity centroid 71 of each of a plurality of interference patterns by a plurality of shaped detection beams obtained by cutting out a part of a cross section, that is perpendicular to an optical axis of each of a plurality of detection beams, of the plurality of detection beams obtained by combining the plurality of first partial cross section laser beams and the plurality of test beams (second partial intensity laser beams), respectively on same optical paths into a shape of a circle with a point, where the cross section of the each detection beam and an optical axis of the each phase conversion devices 61A, 61B, 61C and 61D intersect, as a center thereof, and detecting an inter-beam phase difference of each of the plurality of test beams (second partial intensity laser beams) L2A, L2B, L2C and L2D with respect to the plurality of first partial cross section laser beams based on the azimuth angle 72. The phase controllers 53A, 53B, 53C and 53D according to the eighth aspect has a function of controlling the phase of each of the test beams (second partial intensity laser beams) L2A, L2B, L2C and L2D based on each of the inter-beam phase differences. As a result, there is an effect in that a high-quality and high-power laser beam can be generated since the inter-beam phase difference of each of the plurality of test beams (second partial intensity laser beams) L2A, L2B, L2C and L2D with respect to the plurality of first partial cross section laser beams can be controlled simultaneously.

(15) A beam output apparatus 1, 10, 100 according to a ninth aspect is the beam output apparatus 1, 10, 100 according to the first to eighth aspects and is provided with a half-wave plate 41, an amplifier 55A that is different from the amplifier 55 according to the seventh or eighth aspect, a polarizing beam splitter 112, a second beam splitter 161, and a third beam splitter 166. When a laser beam L0 outputted by the laser oscillator 2 is linear-polarized, it is necessary to make the polarization direction of the first beam L10 be s-polarized with respect to the polarizing beam splitter 112 and the polarization direction of the second beam L20 be p-polarized, in order to split the laser beam L0 by a beam splitter 3, that is a half mirror, into two beams to respectively amplify and then combine them by a polarization composition with the polarizing beam splitter 112. For this reason, the half-wave plate 41 rotates a linear polarization direction of at least one of the first laser beam L10 and the second laser beam L20. Although in FIG. 12 the half-wave plate 41 is shown only in the optical path of the first beam L10 for convenience, the present aspect is not limited to this example. The amplifier 55A, that is different from the amplifier 55 according to the seventh or eighth aspect, amplifies the second laser beam L20. The polarizing beam splitter 112 combines the first laser beam L10 and the second laser beam L20, of which the linear polarization directions are different from each other, to generate a third laser beam L30. The second beam splitter 161 splits the third laser beam L30 into a combined laser beam L31 and a detection laser beam L40. The third beam splitter 166 splits the detection laser beam L40 into a first detection laser beam L41 and a second laser beam L42. The detection device 60 according to the ninth aspect detects the azimuth angle 72 of the intensity centroid 71 of the interference pattern generated by the first detection laser beam L41 and the second detection laser beam L42. As a result, there is an effect in that a laser beam with a high quality and a higher power can be generated, since the beam that was amplified as a reference beam for generating an interference pattern can be used and two beams can be combined on a same optical path.

(16) A phase difference measuring method according to a first aspect is provided with a first step of converting a first laser beam L1 that has passed through a phase conversion device 61, 7, 610 to include a phase distribution of one cycle in an azimuth direction in a cross section of the first laser beam L1 that has passed therethrough included in an arbitrary virtual plane perpendicular to an optical axis of the first laser beam L1, and a second step of detecting an azimuth angle 72 of an intensity centroid 71 of an interference pattern and detecting an inter-beam phase difference of a second laser beam L2 with respect to the first laser beam L1 based on the azimuth angle 72. The interference pattern is generated by a shaped detection beam L5 obtained by cutting out a part of a cross section of the detection beam L4 into a shape of a circle with a point, where the cross section of the detection beam L4 and an optical axis of the phase conversion device 61, 7, 610 intersect, as a center thereof. The cross section of the detection beam L4 is perpendicular to an optical axis A4 of a detection beam L4. The detection beam L4 is obtained by combining a reference beam L12 that is a first partial intensity laser beam and a test beam L22 that is a second partial intensity laser beam on a same optical path. The first partial intensity laser beam has at least a part of an intensity component of the first laser beam L1 that is converted. The second partial intensity laser beam has at least a part of an intensity component of the second laser beam L2 derived from a laser beam L0 as seed light from which the first laser beam L1 derives.

The phase difference measuring method according to the first aspect has an effect in that a high-power and high-quality laser beam can be generated by the first step and the second step.

The first step has a function of converting a first laser beam L1 that passes therethrough so that the first laser beam L1 that has passed therethrough includes a phase distribution of one cycle in an azimuth direction in a cross section of the first laser beam L1 included in an arbitrary virtual plane perpendicular to an optical axis of the first laser beam L1 that has passed therethrough. Such a function may be realized by use of an optical device such that a phase is different according to a part of a laser beam that passes therethrough. As such an optical device, there are a spiral phase plate 61, a hologram 7 corresponding to the spiral phase plate 61, a multilevel spiral phase plate 610, or the like.

The second step has a function of detecting an azimuth angle 72 of an intensity centroid 71 of an interference pattern generated by a shaped detection beam L5 obtained by cutting out a part of a cross section, that is perpendicular to an optical axis A4 of a detection beam L4, of the detection beam L4 obtained by combining a reference beam L12 that is a first partial intensity laser beam, that has at least a part of an intensity component of the converted first laser beam L1, and a test beam L22 that is a second partial intensity laser beam, that has at least a part of an intensity component of a second laser beam L2 derived from a laser beam L0 as seed light from which the first laser beam L1 derives, on a same optical path, into a shape of a circle with a point, where the cross section of the detection beam L4 and an optical axis of the phase conversion device 61, 7, 610 intersect, as a center thereof, and detecting an inter-beam phase difference of the second laser beam L2 with respect to the first laser beam L1 based on the azimuth angle 72. As a device having such a function, there is a four-quadrant detector 64 provided with four sensors, that detect optical intensities $P_1$, $P_2$, $P_3$ and $P_4$ that are respectively included in four quadrants of the interference pattern, or the like.

The present application claims priority of Japanese Patent Application No. 2020-061991, filed on Mar. 31, 2020, the whole disclosure of which is incorporated herein by reference.

The invention claimed is:

1. Phase difference measuring device comprising:
a phase conversion device configured to convert a first laser beam that passes therethrough, so that the first laser beam includes a phase distribution of one cycle in an azimuth direction in a cross section of the first laser beam that has passed therethrough included in an arbitrary virtual plane perpendicular to an optical axis of the first laser beam; and
a detection device configured to detect an azimuth angle of an intensity centroid of an interference pattern and detect an inter-beam phase difference of a second laser beam with respect to the first laser beam based on the azimuth angle for a measurement of the inter-beam phase difference,
wherein the interference pattern is generated by a shaped detection beam in a cross section of a detection beam,
wherein the cross section of the shaped detection beam is a circle having a predetermined radius and having a center at a point, where the cross section of the detection beam and an extension line extended along an optical axis from an optical axis of the phase conversion device intersect,
wherein the cross section is perpendicular to an optical axis of the detection beam,
wherein a part outside the circle is masked,
wherein the detection beam is obtained by combining a first partial intensity laser beam and a second partial intensity laser beam on a same optical path,
wherein the first partial intensity laser beam has at least a part of an intensity component of the first laser beam that has passed through the phase conversion device, and
wherein the second partial intensity laser beam has at least a part of an intensity component of a second laser beam derived from a laser beam as seed light from which the first laser beam derives.

2. The phase difference measuring device according to claim 1,
wherein the detection device comprises:
a sensor device that has a plurality of sensors configured to detect optical intensity in each of a plurality of regions included in the interference pattern; and
a processor configured to calculate the azimuth angle of the optical intensity centroid of the interference pattern based on the optical intensity, and calculate the inter-beam phase difference based on the azimuth angle.

3. The phase difference measuring device according to claim 2,
wherein the sensor device comprises:
a four-quadrant detector that has four sensors configured to detect four optical intensities, respectively, wherein the four optical intensities respectively correspond to four regions included in the interference pattern,
wherein the four regions are four quadrants defined by a cartesian coordinate system provided on a virtual plane perpendicular to the optical axis of the first laser beam.

4. The phase difference measuring device according to claim 1, wherein the phase conversion device comprises a spiral phase plate configured to convert a wavefront of the first laser beam, that passes therethrough, into a spiral.

5. The phase difference measuring device according to claim 1,
wherein the phase conversion device comprises a hologram of a spiral phase plate configured to convert a wavefront of the first laser beam, that passes therethrough, into a spiral.

6. The phase difference measuring device according to claim 1, wherein the phase conversion device comprises a multilevel spiral phase plate configured to convert a wavefront of the first laser beam, that passes therethrough, from a state with spatially-uniform-phase into a multilevel spiral state.

7. A beam output apparatus comprising:
a first beam splitter configured to split a laser beam configured to be seed light into a first laser beam and another laser beam from which a second laser beam derives;
a phase conversion device configured to convert the first laser beam that passes therethrough, so that the first laser beam that has passed therethrough includes a phase distribution of one cycle in an azimuth direction in a cross section of the first laser beam included in an arbitrary virtual plane perpendicular to an optical axis of the first laser beam that has passed therethrough;
a detection device configured to detect an azimuth angle of an intensity centroid of an interference pattern and detect an inter-beam phase difference of the second laser beam with respect to the first laser beam based on the azimuth angle; and
a phase controller configured to control a phase of the second laser beam based on the inter-beam phase difference,
wherein the interference pattern is generated by a shaped detection beam in a cross section of a detection beam,
wherein the cross section of the shaped detection beam is a circle having a predetermined radius and having a center at a point, where the cross section of the detection beam and an extension line extended along an optical axis from an optical axis of the phase conversion device intersect,
wherein the cross section is perpendicular to an optical axis of the detection beam,
wherein a part outside the circle is masked,
wherein the detection beam is obtained by combining a first partial intensity laser beam and a second partial intensity laser beam on a same optical path,
wherein the first partial intensity laser beam has at least a part of an intensity component of the first laser beam that has passed through the phase conversion device, and
wherein the second partial intensity laser beam has at least a part of an intensity component of a second laser beam.

8. The beam output apparatus according to claim 7, wherein the detection device comprises:

a sensor device that has a plurality of sensors configured to detect optical intensity in each of a plurality of regions included in the interference pattern; and
a processor configured to calculate an azimuth angle of an optical intensity centroid of the interference pattern based on the optical intensity, and calculate an inter-beam phase difference based on the azimuth angle.

9. The beam output apparatus according to claim 8, wherein the sensor device comprises:
a four-quadrant detector that has four sensors configured to respectively detect four optical intensities that respectively correspond to four regions included in the interference pattern,
wherein the four regions are four quadrants defined by a cartesian coordinate system provided on an arbitrary virtual plane perpendicular to the optical axis of the first laser beam.

10. The beam output apparatus according to claim 7, wherein the phase conversion device comprises a spiral phase plate configured to convert a wavefront of the first laser beam, that passes therethrough, into a spiral.

11. The beam output apparatus according to claim 7, wherein the phase conversion device comprises a hologram of a spiral phase plate configured to convert a wavefront of the first laser beam, that passes therethrough, into a spiral.

12. The beam output apparatus according to claim 7, wherein the phase conversion device comprises a multilevel spiral phase plate configured to convert a wavefront of the first laser beam, that passes therethrough, into a spiral.

13. The beam output apparatus according to claim 7, further comprising an amplifier configured to amplify the second laser beam.

14. The beam output apparatus according to claim 7, further comprising:
a splitting device configured to split the second laser beam into a plurality of second split intensity laser beams, each of which has a part of intensity component of the second laser beam; and
a plurality of amplifiers configured to respectively amplify the plurality of second split intensity laser beams,
wherein the phase conversion device includes a plurality of phase conversion devices arranged so that a plurality of first partial cross section laser beams including parts of beam cross sections of the first laser beam, respectively pass therethrough,
wherein each of the plurality of phase conversion devices is configured to convert each of the plurality of first partial cross section laser beams that passes therethrough, so that each of the plurality of first partial cross section laser beams includes a phase distribution of one cycle in an azimuth direction in a cross section of each of the plurality of first partial cross section laser beams that has passed therethrough included in an arbitrary virtual plane perpendicular to an optical axis of each of the plurality of first partial cross section laser beams,
wherein the detection device is further configured to detect an azimuth angle of an intensity centroid of each of a plurality of interference patterns in a plurality of shaped detection beams and detect an inter-beam phase difference of each of a plurality of second partial intensity laser beams with respect to the plurality of first partial cross section laser beams based on the azimuth angle,
wherein the plurality of second partial intensity laser beams derive from the plurality of second split intensity laser beams, respectively,
wherein the plurality of shaped detection beams are each a circle having a predetermined radius and having a center at a point, where the cross section of the each detection beam and an extension line extended along an optical axis from an optical axis of the each phase conversion device intersect,
wherein the cross section is perpendicular to an optical axis of each of the plurality of detection beams,
wherein a part outside the circle is masked,
wherein the plurality of detection beams is obtained by combining the plurality of first partial cross section laser beams and the plurality of second partial intensity laser beams, respectively on same optical paths, and
wherein the phase controller is further configured to control a phase of each of the plurality of second partial intensity laser beams based on the each inter-beam phase difference.

15. The beam output apparatus according to claim 7, further comprising:
a half-wave plate configured to convert a linear polarization direction of at least one of the first laser beam and the second laser beam;
another amplifier configured to amplify the first laser beam;
a polarizing beam splitter configured to combine the first laser beam and the second laser beam, each of which the linear polarization direction is different from each other, to generate a third laser beam;
a second beam splitter configured to split the third laser beam into a combined laser beam and a detection laser beam; and
a third beam splitter configured to split the detection laser beam into a first detection laser beam and a second detection laser beam,
wherein the detection device is further configured to detect an azimuth angle of an intensity centroid of an interference pattern generated by the first detection laser beam and the second detection laser beam.

16. A phase difference measuring method including:
converting a first laser beam that has passed through a phase conversion device, so that the first laser beam includes a phase distribution of one cycle in an azimuth direction in a cross section of the first laser beam included in an arbitrary virtual plane perpendicular to an optical axis of the first laser beam;
detecting an azimuth angle of an intensity centroid of an interference pattern; and
detecting an inter-beam phase difference of a second laser beam with respect to the first laser beam based on the azimuth angle, wherein the interference pattern is generated by a shaped detection beam in a cross section of a detection beam,
wherein the cross section of the shaped detection beam is a circle having a predetermined radius and having a center at a point, where the cross section of the detection beam and an extension line extended along an optical axis from an optical axis of the phase conversion device intersect,
wherein the cross section is perpendicular to an optical axis of the detection beam,
wherein a part outside the circle is masked,
wherein the detection beam is obtained by combining a first partial intensity laser beam and a second partial intensity laser beam on a same optical path, wherein the first partial intensity laser beam has at least a part of an intensity component of the first laser beam that is converted, and wherein the second partial intensity laser beam has at least a part of an intensity component of a second laser beam derived from a laser beam as seed light from which the first laser beam derives.

* * * * *